(12) United States Patent
Kawai

(10) Patent No.: US 8,332,054 B2
(45) Date of Patent: *Dec. 11, 2012

(54) OPERATION TARGET IDENTIFICATION SYSTEM

(75) Inventor: Sunao Kawai, Toyoake (JP)

(73) Assignee: Brother Kogyo Kabushiki Kaisha, Nagoya-shi, Aichi-ken ( * ) Notice: Subject to any disclaimer, the term of this patent is extended or adjusted under 35 U.S.C. 154(b) by 0 days.

This patent is subject to a terminal disclaimer.

(21) Appl. No.: 12/688,423

(22) Filed: Jan. 15, 2010

(65) Prior Publication Data

US 2010/0122181 A1    May 13, 2010

Related U.S. Application Data

(62) Division of application No. 11/377,406, filed on Mar. 17, 2006, now Pat. No. 7,664,555.

(30) Foreign Application Priority Data

Mar. 17, 2005   (JP) ................ 2005-077868

(51) Int. Cl.
G05B 11/01 (2006.01)
G05B 15/00 (2006.01)
G06F 15/177 (2006.01)
G06F 15/173 (2006.01)

(52) U.S. Cl. ............... 700/17; 700/11; 700/1; 709/221; 709/223; 709/224

(58) Field of Classification Search .......... None
See application file for complete search history.

(56) References Cited

U.S. PATENT DOCUMENTS

| | | | |
|---|---|---|---|
| 6,308,205 B1 * | 10/2001 | Carcerano et al. | 709/221 |
| 6,734,985 B1 | 5/2004 | Ochiai | |
| 7,124,177 B2 * | 10/2006 | Watanabe | 709/223 |
| 7,148,979 B1 | 12/2006 | Yanagawa | |
| 2001/0047406 A1 * | 11/2001 | Araujo et al. | 709/223 |
| 2002/0165784 A1 | 11/2002 | Taggart et al. | |
| 2002/0196460 A1 | 12/2002 | Parry | |
| 2004/0059995 A1 | 3/2004 | Takabayashi et al. | |
| 2004/0184072 A1 * | 9/2004 | Jacobsen et al. | 358/1.15 |
| 2005/0114711 A1 * | 5/2005 | Hesselink et al. | 713/201 |

FOREIGN PATENT DOCUMENTS

| | | |
|---|---|---|
| JP | 8-286954 A | 11/1996 |
| JP | 10-136142 A | 5/1998 |
| JP | 2002-108292 A | 4/2002 |
| JP | 2002-157177 A | 5/2002 |
| JP | 2004-328270 A | 11/2004 |

OTHER PUBLICATIONS

JP Office Action dtd Feb. 19, 2008, JP App 2005-077868.

* cited by examiner

*Primary Examiner* — Charles Kasenge
*Assistant Examiner* — Sunray Chang
(74) *Attorney, Agent, or Firm* — Banner & Witcoff, Ltd.

(57) ABSTRACT

An operation target identification system includes at least one terminal device connected to a network, having a first display, devices connected to the network, each of which has a second display, and an identical pattern setting unit provided on the network, which selects one of multiple preset display patterns and sets the selected display pattern to the first display of the terminal device and the second display of one of the devices designated as an operation target of the terminal device.

20 Claims, 17 Drawing Sheets

FIG. 9

| COLOR | BLINKING | STYLE | IN USE |
|---|---|---|---|
| RED | NO | SINGLE COLOR | ABC1234(ERROR),ABC1238(ERROR) |
| | | TILED | |
| | | VERTICAL STRIPES | |
| | YES | SINGLE COLOR | |
| | | TILED | |
| | | VERTICAL STRIPES | |
| BLUE | NO | SINGLE COLOR | |
| | | TILED | |
| | | VERTICAL STRIPES | |
| | YES | SINGLE COLOR | ABC1234(WARNING),ABC1238(WARNING) |
| | | TILED | |
| | | VERTICAL STRIPES | |
| YELLOW | NO | SINGLE COLOR | ABC1238(PRESENT DISPLAY) |
| | | TILED | |
| | | VERTICAL STRIPES | |
| | YES | SINGLE COLOR | |
| | | TILED | |
| | | VERTICAL STRIPES | |
| GREEN | NO | SINGLE COLOR | ABC1111(PRESENT DISPLAY) |
| | | TILED | ABC1234(PRESENT DISPLAY) |
| | | VERTICAL STRIPES | |
| | YES | SINGLE COLOR | |
| | | TILED | |
| | | VERTICAL STRIPES | |
| WHITE | NO | SINGLE COLOR | |
| | | TILED | |
| | | VERTICAL STRIPES | |
| | YES | SINGLE COLOR | |
| | | TILED | |
| | | VERTICAL STRIPES | |
| PINK | NO | SINGLE COLOR | |
| | | TILED | |
| | | VERTICAL STRIPES | |
| | YES | SINGLE COLOR | |
| | | TILED | |
| | | VERTICAL STRIPES | |
| ORANGE | NO | SINGLE COLOR | ABC1234(OPERATION),ABC1238(OPERATION) |
| | | TILED | |
| | | VERTICAL STRIPES | |
| | YES | SINGLE COLOR | |
| | | TILED | |
| | | VERTICAL STRIPES | |

FIG.12A
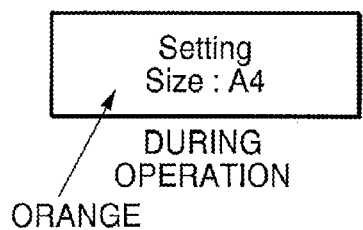
ORANGE — DURING OPERATION
FIG.12B
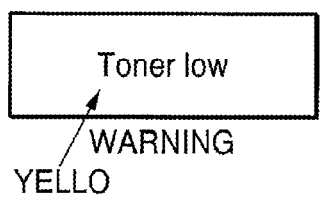
YELLO — WARNING
FIG.12C
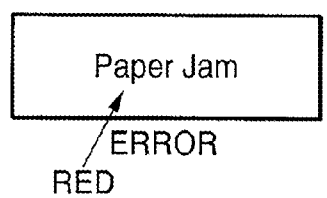
RED — ERROR
FIG.12D
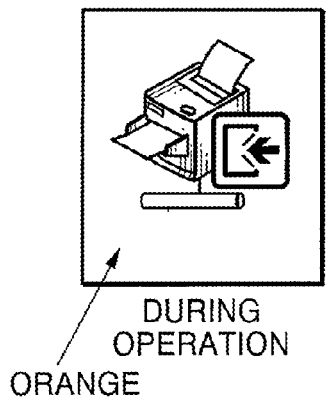
ORANGE — DURING OPERATION
FIG.12E
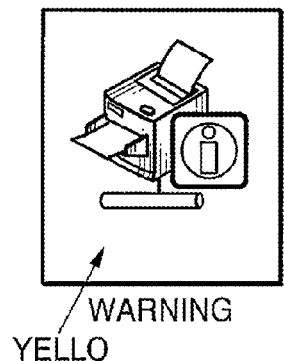
YELLO — WARNING
FIG.12F
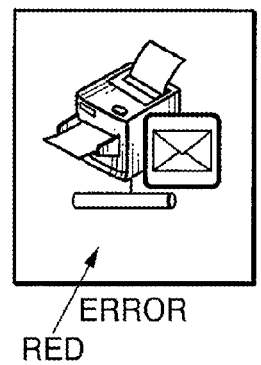
RED — ERROR
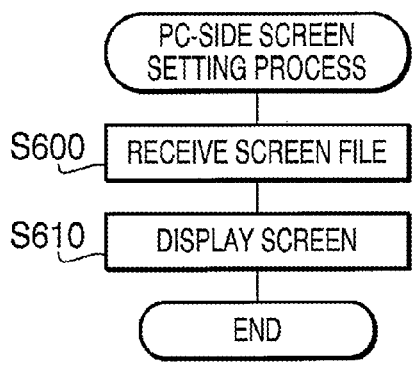
FIG.13

OPERATION TARGET IDENTIFICATION SYSTEM

CROSS-REFERENCE TO RELATED APPLICATION

This application is a divisional of prior U.S. application Ser. No. 11/377,406, filed Mar. 17, 2006, which claims priority under 35 U.S.C. §119 from Japanese Patent Application No. 2005-077868, filed on Mar. 17, 2005. The entire subject matter of these applications is incorporated herein by reference.

FIELD

The following description relates to a technique for allowing a user of a system including a terminal device and devices connected to the terminal device via a network to easily identify or recognize a device that has been designated as an operation target of the terminal device from the devices.

BACKGROUND

Various types of image formation devices such as printers and MFPs (Multi Function Peripherals) are on the market today, and some of the image formation devices are provided with a Web server function and are capable of supplying a Web page (to be used for operating the image formation device) to a terminal device that is connected to the image formation device via a network (see Japanese Patent Provisional Publication No. HEI10-136142, for example).

Such a Web page generally indicates an external view, model name, IP address, serial number, installation location, etc. of the image formation device that has been designated as the operation target of the terminal device in order to let the user of the terminal device easily recognize which of the image formation devices connected to the terminal device is the operation target.

Meanwhile, when image formation devices are introduced into a company, office, etc., there are cases where devices of the same type (model) are installed so as to realize simple maintenance and management of the image formation devices.

In such cases, it is difficult for users to recognize which of the image formation devices is the current operation target of the terminal device at a glance into the aforementioned Web page even if an external view, model name, IP address, serial number, installation location, etc. of the image formation device as the operation target is indicated on the Web page.

An example of a problem with the above technique is shown in FIG. 24, in which the user of the terminal device viewing the Web page can erroneously recognize that the image formation device A is the operation target of the terminal device even though the image formation device B has actually become the operation target.

SUMMARY

Aspects of the disclosure are advantageous in that a technique, allowing users to easily identify or recognize a device that has been designated as the operation target of a terminal device connected to a network even when devices of the same type (model) are connected to the network, can be provided.

BRIEF DESCRIPTION OF THE ACCOMPANYING DRAWINGS

FIG. 9 is a table showing an example of a table stored in a nonvolatile memory or a RAM of the printer to be used for the update process, in which a display parameter, an operation color, a warning color and an error color regarding each printer are stored according to at least some illustrative aspects of the invention.

FIGS. 12A-12C are explanatory drawings showing examples of screens displayed by the printer according to at least some illustrative aspects of the invention.

FIGS. 12D-12F are explanatory drawings showing examples of screens displayed by the PC according to at least some illustrative aspects of the invention.

FIG. 13 is a flow chart showing the procedure of a PC-side screen setting process which is executed by a CPU of the PC according to at least some illustrative aspects of the invention.

DETAILED DESCRIPTION

General Overview

Figure 1:
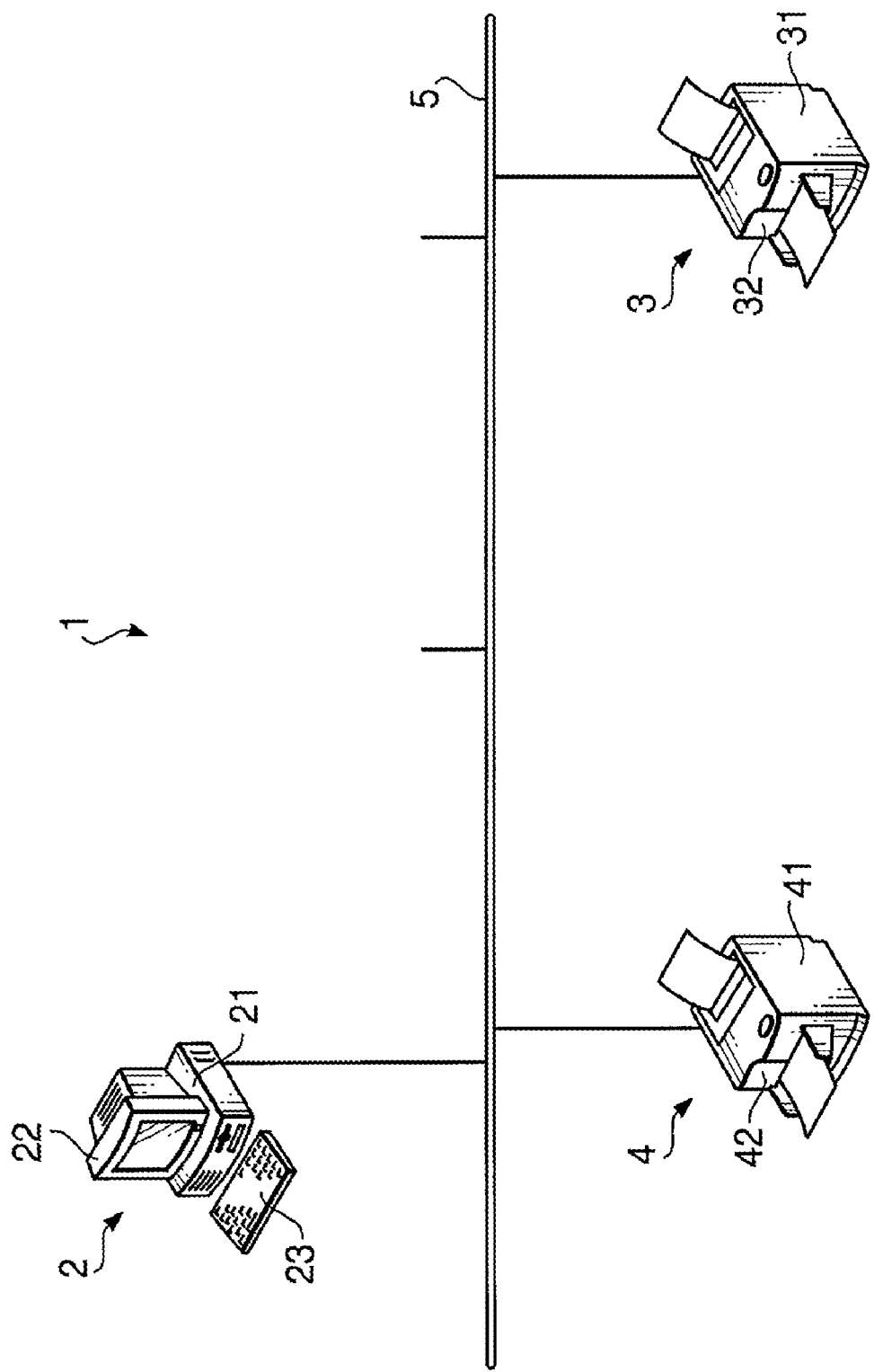
FIG. 1 is a schematic diagram showing a printing system as an operation target identification system in accordance with at least some illustrative aspects of the invention.

There is provided an operation target identification system including at least one terminal device connected to a network, having a first display; devices connected to the network, each of which has a second display; and an identical pattern setting unit provided on the network configured to select one of the preset display patterns and set the selected display pattern to the first display of the terminal device and the second display of one of the devices designated as an operation target of the terminal device.

In the above operation target identification system, the identical pattern setting unit selects a display pattern from multiple preset display patterns and sets the selected display pattern to the first screen of the terminal device and the second screen of the device designated as the operation target of the terminal device.

Therefore, with the above operation target identification system, even when devices of the same type (model) are connected to the network, the user can recognize at a glance that a device with the display pattern of the first screen (i.e. a device whose second screen is indicating a display pattern identical with that of the first screen of the terminal device) is the device designated as the operation target of the terminal device.

As above, the operation target identification system allows the user to recognize a device designated as the operation target of the terminal device at a glance even when devices of the same type (model) are connected to the network.

Incidentally, the network may be implemented either by a wired network using network cables or a wireless network using wireless communication.

The display pattern may be set in any manner as long as the device designated as the operation target of the terminal device can be recognized at a glance. For example, the selected display pattern may include a display color as an element.

By setting the display pattern as above, the device designated as the operation target of the terminal device can be recognized at a glance based on the display color.

In some aspects, the selected display pattern may include a display mode as an element.

By setting the display pattern as above, the device designated as the operation target of the terminal device can be recognized at a glance based on the display mode. Incidentally, the display mode may include the screen contrast, a combination of display colors, a pattern, etc.

In some aspects, the selected display pattern may include a blinking mode as an element.

By setting the display pattern as above, the device designated as the operation target of the terminal device can be recognized at a glance based on the blinking mode. Incidentally, the blinking mode may include the pattern of blinking, the interval between blinks, the duration of each blink, etc.

In some aspects where an information indicating area providing information on the devices is displayed on the first display, the identical pattern setting unit regards a background of the information indicating area as a target of the display pattern setting.

By configuring the identical pattern setting unit as above, the user operating a device via the terminal device is allowed to recognize the device designated as the operation target of the terminal device at a glance while referring to the information on the devices, without the need to refer to the display of information irrelevant to the device operation.

In some aspects where the information indicating area includes a device operating area configured to display operation information for the devices, the identical pattern setting unit regards a background of the device operating area as a target of the display pattern setting.

By configuring the identical pattern setting unit as above, the user is allowed to identify or recognize the device designated as the operation target of the terminal device at a glance while operating the device on the operation screen.

In some aspects where the device operating area is partitioned into a first area for displaying status information representing status of the devices and a second area for displaying information other than the status of the devices, the identical pattern setting unit regards a background of the first area as a target of the display pattern setting.

By configuring the identical pattern setting unit as above, the user is allowed to recognize the device designated as the operation target of the terminal device at a glance while checking the status of the devices on the operation screen. Incidentally, each of the first and second areas may either be composed of one or multiple areas.

In some aspects where a device operating area configured to display operation information for the devices and a link screen linked with the device operating area are displayed on the first display, the identical pattern setting unit regards a background of the device operating area and a background of the link screen as targets of the display pattern setting.

By configuring the identical pattern setting unit as above, the user is allowed to recognize the device designated as the operation target of the terminal device at a glance while referring to the operation screen or the link screen. In at least some aspects when the link screen is displayed, the user is relieved of the need of calling up the operation screen again to recognize the device designated as the operation target of the terminal device.

While the second screen of each device may display any type of information, in some aspects status information representing status of each device can be displayed on the second display of each device.

In this case, the user is allowed to check the status of the devices while recognizing the device designated as the operation target of the terminal device.

In some aspects, the identical pattern setting unit includes an identification unit configured to identify display patterns set to the second displays of the devices other than the second display of the device designated as the operation target of the terminal device. The identical pattern setting unit is configured to select the display pattern to be set to the first display of the terminal device and the second display of the device designated as the operation target of the terminal device if the display pattern differs from every one of the display patterns identified by the identification unit in at least one element.

By configuring the identical pattern setting unit as above, the display pattern of the second screen of the device designated as the operation target of the terminal device is set so that it will not be identical with the display pattern of the second screen of any other device.

Therefore, the user can be prevented from erroneously recognizing a different device as the device designated as the operation target of the terminal device.

In some aspects where a status pattern, as a display pattern to be set to at least one of the first display and the second display depending on status of each device, has been specified previously, the identical pattern setting unit is configured to select the display pattern to be set to the first display of the terminal device and the second display of the device designated as the operation target of the terminal device if the display pattern differs from the status pattern in at least one element.

By configuring the identical pattern setting unit as above, the identical pattern setting unit can be prevented from erroneously selecting a display pattern identical with the status pattern and setting the selected display pattern to the first screen of the terminal device and the second screen of the device designated as the operation target of the terminal device.

In the case where a status pattern to be set to the first screen of the terminal device depending on the status of each device has been specified previously, the above configuration of the identical pattern setting unit can prevent the user from erroneously recognizing that the display pattern of the first screen has been set for the recognition of the device designated as the operation target of the terminal device even though the display pattern has been set depending on the status of a device.

In the case where a status pattern to be set to the second screen of each device depending on the status of the device has been specified previously, the above configuration of the identical pattern setting unit can prevent the user from erroneously recognizing that the display pattern of the second screen has been set for the recognition of the device designated as the operation target of the terminal device even though the display pattern has been set depending on the status of the device. Further, the user can be prevented from mistaking a different device (having the status pattern on its second screen) for the device designated as the operation target of the terminal device.

In some aspects the identical pattern setting unit includes a selection instruction receiving unit configured to receive a selection instruction for selecting a display pattern. The identical pattern setting unit is configured to select the display pattern to be set to the first display of the terminal device and the second display of the device designated as the operation target of the terminal device according to the selection instruction received by the selection instruction receiving unit.

By configuring the identical pattern setting unit as above, the selection of the display pattern can be made through the selection instruction. For example, by configuring the identical pattern setting unit so as to let the user of the terminal device input the selection instruction to the identical pattern setting unit, the user can select the display pattern and can easily recognize the device designated as the operation target of the terminal device only by finding a device displaying the display pattern that he or she selected.

In some aspects the identical pattern setting unit is configured to identify display patterns set to the second displays of the devices other than the second display of the device designated as the operation target of the terminal device in response to the selection of the display pattern. In response to the selected display pattern being the same as at least one of the identified display patterns, the identical pattern setting unit is configured to reselect a display pattern other than the selected display pattern that differs from every one of the identified display patterns in at least one element.

By configuring the identical pattern setting unit as above, even when a display pattern identical with the display pattern set to the second screen of a device other than the device designated as the operation target of the terminal device is selected, a display pattern differing from the above display pattern in at least one element can be set to the first screen of the terminal device and the second screen of the device designated as the operation target of the terminal device.

Therefore, the display pattern of the second screen of the device designated as the operation target of the terminal device can be set so that it will not be identical with the display pattern of the second screen of any other device, by which the user can be prevented from erroneously recognizing a different device as the device designated as the operation target of the terminal device.

In some aspects where a status pattern, as a display pattern to be set to at least one of the first display and the second display depending on status of each device, is specified previously, the identical pattern setting unit is configured to judge whether the selected display pattern is the same as the status pattern in response to the selection of the display pattern. In response to the selected display pattern being the same as the status pattern, the identical pattern setting unit is configured to reselect a display pattern other than the selected display pattern that differs from the status pattern in at least one element.

By configuring the identical pattern setting unit as above, even when a display pattern identical with the status pattern is selected, a display pattern differing from the above display pattern (status pattern) in at least one element can be set to the first screen of the terminal device and the second screen of the device designated as the operation target of the terminal device.

In some aspects each of the devices includes: a status detecting unit configured to detect status of the device; and a device-side specified pattern setting unit configured to operate in response to a state to be reported being detected by the status detecting unit and a display pattern having already been set to the second display of the device by the identical pattern setting unit, and configured to set a specified pattern (which has been specified previously corresponding to the state to be reported) to the second display other than the display pattern set by the identical pattern setting unit. Incidentally, the "specified pattern" which is specified previously may be a fixed color associated with a particular state of the device (e.g. red in case of an error, yellow in case of a warning, etc.).

By configuring each device as above, even when the display pattern for the recognition of the device designated as the operation target of the terminal device has been set to the second screen, the "specified pattern" is set to the second screen when the state to be reported occurs for the device (e.g. a previously specified color associated to the state is displayed on the second screen), by which the user can recognize at a glance that the state to be reported is occurring.

In some aspects each of the devices includes a first operation cancellation unit configured to cancel the operation of the device-side specified pattern setting unit in response to the state to be reported no longer being detected by the status detecting unit during the operation of the device-side specified pattern setting unit.

By configuring each device as above, the specified pattern set to the second screen is canceled when the state to be reported occurring to the device ceases, by which the user can recognize at a glance that the state to be reported has ended in the device. Further, by restoring the second screen to the display pattern set by the identical pattern setting unit, it is possible to let the user of the terminal device recognize again that the device has been designated as the operation target of the terminal device.

In some aspects where the status detecting unit is configured to detect states to be reported, the device-side specified pattern setting unit is configured to operate if a specified state (as one of the states to be reported that has been specified previously) is detected by the status detecting unit.

By configuring the device-side specified pattern setting unit as above, the setting of the "specified pattern" to the second screen is made only when the "specified state", among the states to be reported, is occurring to the device, by which the user can recognize at a glance that the "specified state" (especially specified from the states to be reported) is occurring for the device. In other cases, the user can keep recognizing whether each device is the device designated as the operation target of the terminal device.

Incidentally, any state can be specified as the above "specified state". For example, the specified state may include an abnormal state which has been specified previously.

By specifying the specified state as above, the specified pattern can be set to the second screen of a device when the previously specified abnormal state occurs for the device, by which the user can recognize at a glance that the previously specified abnormal state (especially specified from the states to be reported) is occurring for the device.

In some aspects the specified state may include an external operation state in which the device is subjected to an external operation.

By specifying the specified state as above, the specified pattern can be set to the second screen of a device when the device is in the external operation state, that is, when the device is subjected to an external operation. Therefore, the second screen of the device in the external operation state displays a display pattern (specified pattern) originally supposed to be displayed in the external operation state, by which the user operating the device can be relieved of a reduction in operability, a feeling of strangeness, etc. caused by the display pattern set to the second screen by the identical pattern setting unit. When the user is operating keys, etc. on the exterior surface of the device, the display of the specified pattern originally specified for the external operation state, maintaining the viewability of information displayed on the second screen, is desirable.

While the above specified state may be specified to include the external operation state only, the specified state may also be specified to include a preset time period from the end of the external operation.

In some aspects each of the devices includes a status detecting unit configured to detect status of the device. The network is provided with a terminal-side specified pattern setting unit configured to operate in response to a state to be reported being detected by the status detecting unit and a display pattern having already been set to the first display by the identical pattern setting unit, and configured to set a specified pattern (which has been previously specified corresponding to the state to be reported) to the first display other than the display pattern set by the identical pattern setting unit. Incidentally, the "specified pattern" which is previously specified may be a fixed color associated with a particular state of the device (e.g. red in case of an error, yellow in case of a warning, etc.).

By the above configuration, even when the display pattern for the recognition of the device designated as the operation target of the terminal device has been set to the first screen, the "specified pattern" is set to the first screen when the state to be reported occurs for a device (e.g. a previously specified color associated to the state is displayed on the first screen), by which the user can recognize at a glance that the state to be reported is occurring for a device.

In some aspects the network is provided with a second operation cancellation unit configured to cancel the operation of the terminal-side specified pattern setting unit in response to the state to be reported no longer being detected by the status detecting unit during operation of the terminal-side specified pattern setting unit.

By the above configuration, the specified pattern set to the first screen is canceled when the state to be reported occurring to the device ceases, by which the user can recognize at a glance that the state to be reported has ended in the device. Further, by restoring the first screen to the display pattern set by the identical pattern setting unit, it is possible to let the user of the terminal device recognize again that the device has been designated as the operation target of the terminal device.

In some aspects where the status detecting unit is configured to detect states to be reported, the terminal-side specified pattern setting unit is configured to operate if a specified state (as one of the states to be reported that has been specified previously) is detected by the status detecting unit.

By configuring the terminal-side specified pattern setting unit as above, the setting of the "specified pattern" to the first screen is made only when the "specified state", among the states to be reported, is occurring for a device, by which the user can recognize at a glance that the "specified state" (specified from the states to be reported) is occurring for the device. In other aspects, the user can keep recognizing whether each device is the device designated as the operation target of the terminal device.

Incidentally, any state can be specified as the above "specified state". For example, the specified state may include an abnormal state which has been specified previously.

By specifying the specified state as above, the specified pattern can be set to the first screen of the terminal device when the previously specified abnormal state occurs to a device, by which the user can recognize at a glance that the previously specified abnormal state (especially specified from the plurality of states to be reported) is occurring to a device.

In some aspects the specified state may include an external operation state in which the device is subjected to an external operation.

By specifying the specified state as above, the specified pattern can be set to the first screen of the terminal device when a device is in the external operation state, by which the user can recognize at a glance that a device is in the external operation state (specified from the states to be reported).

While the above specified state may be specified to include the external operation state only, the specified state may also be specified to include a preset time period from the end of the external operation.

The identical pattern setting unit may be placed anywhere on the network. For example, the identical pattern setting unit may be installed in the terminal device, or installed in each of the devices.

It is also possible to connect a server to the network and install the identical pattern setting unit in the server.

There is provided a terminal device connected to a network for operating devices connected to the network. The terminal device includes an identical pattern setting unit configured to select one of the preset display patterns and to set the selected display pattern to a first display of the terminal device and a second screen of one of the devices designated as an operation target of the terminal device.

There is provided a device connected to a network including devices and a terminal device operating the devices. The device includes an identical pattern setting unit configured to select one of the preset display patterns and to set the selected display pattern to a first display of the terminal device and a second display of one of the devices designated as an operation target of the terminal device.

There is provided a server connected to a network including devices and a terminal device operating the devices. The server includes an identical pattern setting unit configured to select one of the preset display patterns and to set the selected display pattern to a first display of the terminal device and a second display of one of the devices designated as an operation target of the terminal device.

There is provided a computer program product including computer-readable instructions that cause a terminal device, connected to a network for operating devices connected to the network, to function as an identical pattern setting unit which selects one of the preset display patterns and sets the selected display pattern to a first display of the terminal device and a second display of one of the devices designated as an operation target of the terminal device.

There is provided a computer program product including computer-readable instructions that cause a device, connected to a network including devices and a terminal device operating the devices, to function as an identical pattern setting unit which selects one of the preset display patterns and sets the selected display pattern to a first display of the terminal device and a second display of one of the devices designated as an operation target of the terminal device.

There is provided a computer program product including computer-readable instructions that cause a server, connected to a network including devices and a terminal device operating the devices, to function as an identical pattern setting unit which selects one of preset display patterns and sets the selected display pattern to a first display of the terminal device and a second display of one of the devices designated as an operation target of the terminal device.

A computer program implementing each of the above computer program products may be stored in a computer-readable record medium (flexible disk (FD), optical disk (MO), DVD, CD-ROM, hard disk, memory card, etc.) to be loaded from the record medium into a computer for use in the computer. The program may also be stored in a ROM or backup RAM installed in a computer to be loaded into the computer. Further, the program may also be loaded into a computer via a network.

ILLUSTRATIVE EMBODIMENTS

Referring now to the drawings, a description will be given in detail of illustrative embodiments.

First Illustrative Embodiment

FIG. 1 is a schematic diagram showing a printing system 1 as an operation target identification system in accordance with a first illustrative embodiment of the present invention.

As shown in FIG. 1, the printing system 1 includes a personal computer (PC) 2 and printers 3 and 4. The printers 3 and 4 are of the same type (model). In the printing system 1, these devices are connected together via a network 5 which is implemented by network cables (not shown) and routers (not shown). Incidentally, while only the PC 2 and the printers 3 and 4 are shown in FIG. 1 for simplification of the explanation of the first illustrative embodiment, the actual printing system 1 may include a lot of other devices (other PCs of the same type as the PC 2 or different types, other printers of the same type as the printers 3 and 4, etc.) connected to the network 5.

The PC 2 is formed by connecting a display 22, a keyboard 23, a mouse (not shown), etc. to a main body 21. Each printer (3, 4) is provided with a screen (32, 42) for displaying status information on the printer (3, 4). Each screen (32, 42) is implemented by an LCD (Liquid Crystal Display) capable of color display and is placed at a viewable position on the exterior surface of a main body (31, 41) of the printer (3, 4).

Figure 2:
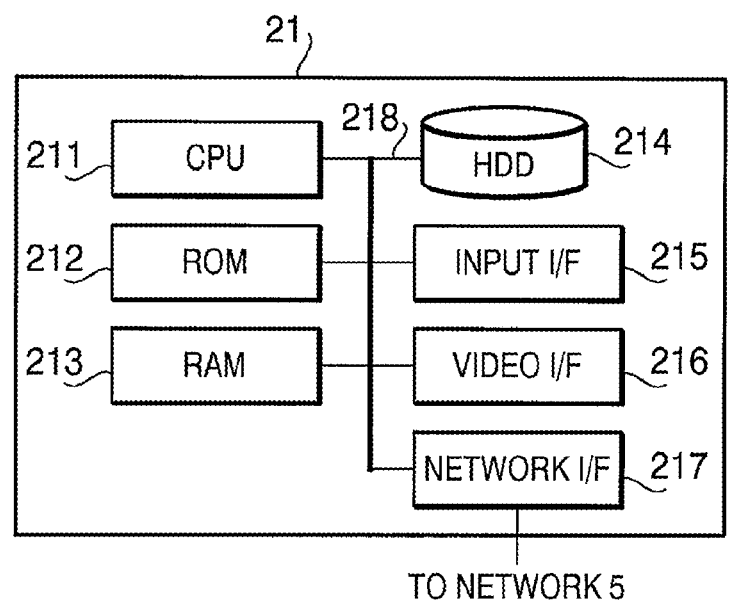
FIG. 2 is a block diagram showing the internal composition of a main body of a PC included in the printing system of FIG. 1 according to at least some illustrative aspects of the invention.

FIG. 2 is a block diagram showing the internal composition of the main body 21 of the PC 2.

As shown in FIG. 2, the main body 21 includes a CPU (Central Processing Unit) 211 for executing various processes to be performed by the PC 2, a ROM (Read Only Memory) 212 storing data such as a startup program (BIOS) which is run by the CPU 211 at the startup of the PC 2, a RAM (Random Access Memory) 213 which is used as a storage area when the CPU 211 executes various processes, an HDD (Hard Disk Drive) 214 for storing data (e.g. an operating system, a Web browser program, and programs for various processes to be executed by the CPU 211), an input I/F (interface) 215 for the inputting of input signals (supplied from the keyboard 23, mouse, etc. connected to the main body 21) to the CPU 211, a video I/F 216 for letting the display 22 (connected to the main body 21) display screens according to instructions from the CPU 211, and a network I/F 217 which is connected to the network 5 for connecting the CPU 211 with other devices connected to the network 5.

In the main body 21, the above components are connected together by a signal bus 218.

Figure 3:
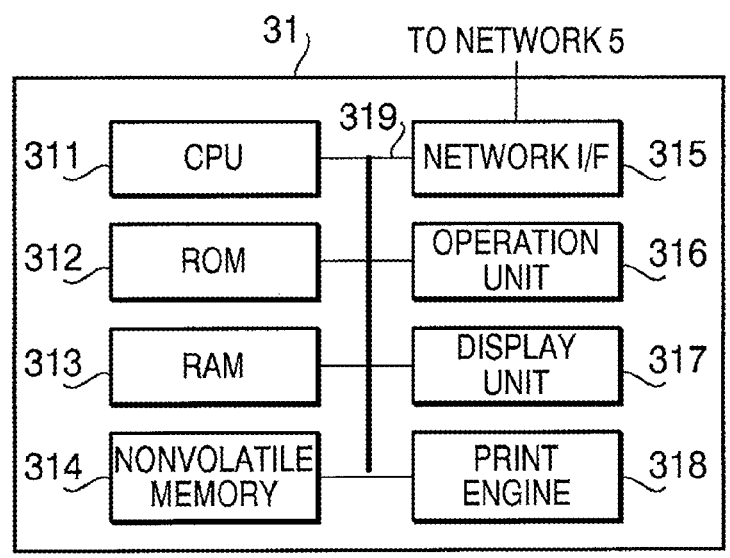
FIG. 3 is a block diagram showing the internal composition of a main body of the printer included in the printing system of FIG. 1 according to at least some illustrative aspects of the invention.

FIG. 3 is a block diagram showing the internal composition of the main body 31 of the printer 3. Since the printers 3 and 4 are of the same type (model), the following explanation of the internal composition of the main body 31 of the printer 3 holds also for the main body 41 of the printer 4.

As shown in FIG. 3, the main body 31 includes a CPU 311 for controlling the following components inside the main body 31, a ROM 312 storing data (e.g. an operating system (specifically, embedded OS), a Web server program for letting the printer 3 function as a Web server, and programs for various processes to be executed by the CPU 311), a RAM 313 which is used as a storage area when the CPU 311 executes various processes, a nonvolatile memory 314 for recording data (e.g. data generated by the CPU 311 executing various processes and errors occurring in the processes), and a network I/F 315 which is connected to the network 5 for connecting the CPU 311 with other devices connected to the network 5.

The main body 31 further includes an operation unit 316 for the inputting of input signals (from various operation switches, buttons, etc. (not shown) provided on the exterior surface of the main body 31 for operating the printer 3 from outside) to the CPU 311, a display unit 317 for displaying the status information on the printer 3, etc. on the screen 32 according to instructions from the CPU 311, and a print engine 318 for executing printing according to instructions from the CPU 311.

In the main body 31, the above components are connected together by a signal bus 319.

In the following, some of the processes executed by the PC 2 and the printers 3 and 4 that are relevant to certain aspects of the present invention will be described in detail. Since the printers 3 and 4 are designed to execute totally the same processes in accordance with the illustrative embodiments, the explanation of processes executed by the printer 3 which will be given below holds also for the printer 4.

First, the Web browser program is activated by the CPU 211 of the PC 2 in response to an operation by the user to the keyboard 23 or the mouse. When one of the printers 3 and 4 is selected and designated by the user as the target of operation (hereinafter referred to as "the operation target") from a previously registered menu or printer list, an IP address or a node name (URL) of the selected printer is entered in the Web browser. In the case where a node name is entered in the Web browser, the CPU 211 inquires of a DNS server about the IP address of the selected printer according to a prescribed communication protocol (HTTP (Hypertext Transfer Protocol) in the first illustrative embodiment), obtains the IP address from the DNS server, and transmits a request for a Web page to the obtained IP address as the destination. In the case where an IP address is entered in the Web browser, the CPU 211 transmits the request for the Web page to the entered IP address as the destination. When a Web page indicating information on the selected printer (top page) is received from the printer, the CPU 211 of the PC 2 displays the received Web page on a Web browser screen being displayed on the display 22. Incidentally, while the user selects and designates the printer as the operation target from the menu or printer list in this explanation, the user may also designate the operation target printer by directly entering the IP address or node name (URL) of the printer in the Web browser.

Figure 4:
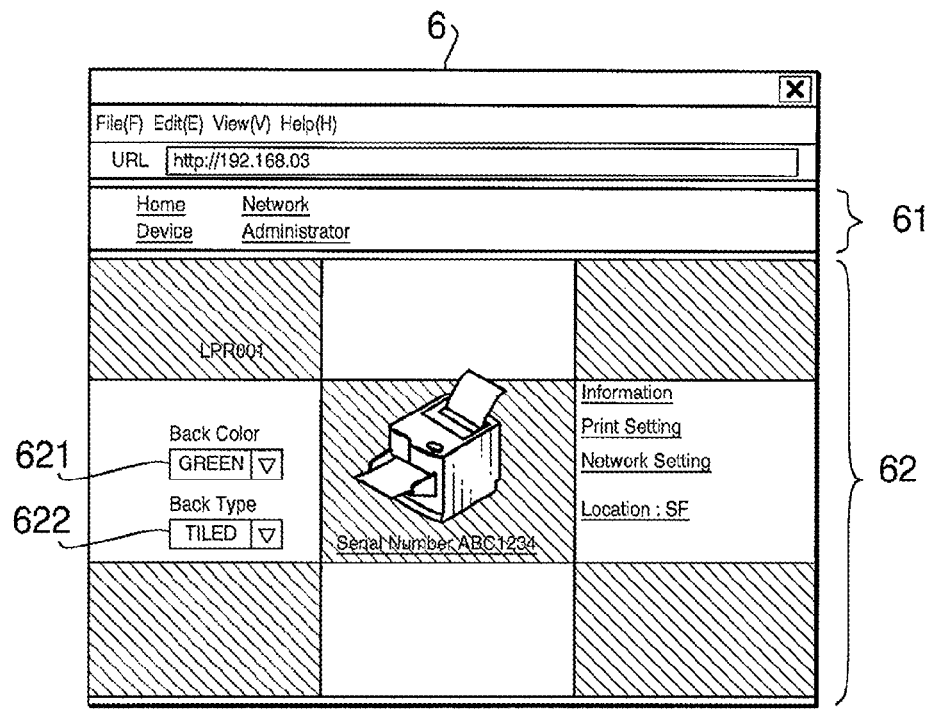
FIG. 4 is an explanatory drawing showing a Web browser screen displayed by the PC, on which a Web page received from a printer in the printing system is displayed according to at least some illustrative aspects of the invention.

FIG. 4 is an explanatory drawing showing a Web browser screen 6 displayed by the PC 2, on which a Web page received from a printer (3, 4) is displayed.

As shown in FIG. 4, the Web browser screen 6 is partitioned into a link display frame 61 and a status display frame 62. The status display frame 62 is an area for displaying the status information on the printer (3, 4). The link display frame 61 is an area for displaying links to be selected for switching the contents of the status display frame 62.

Specifically, the link display frame 61 displays links to other Web pages which have been assigned to the printer (3, 4).

The status display frame 62 displays a variety of information such as an illustration of the printer (3, 4), the model name, serial number and installation location of the printer (3, 4), a list box 621 to be used by the user of the PC 2 for selecting one of preset display colors (red, blue, yellow, green, white, pink, orange, etc.) as the display color of the background of the status display frame 62, and a list box 622 to be used by the user for selecting one of preset display styles (e.g. a combination of a display mode (tiled pattern, single color filling, etc.) and a color blinking mode) as the display style of the background of the status display frame 62.

When a display color or a display style is selected by the user from the list box 621 or 622, the CPU 211 of the PC 2 transmits a Web page update request to the printer as the sender of the Web page, together with a display parameter specifying the selected display color and/or display style.

Figures 5, 6:
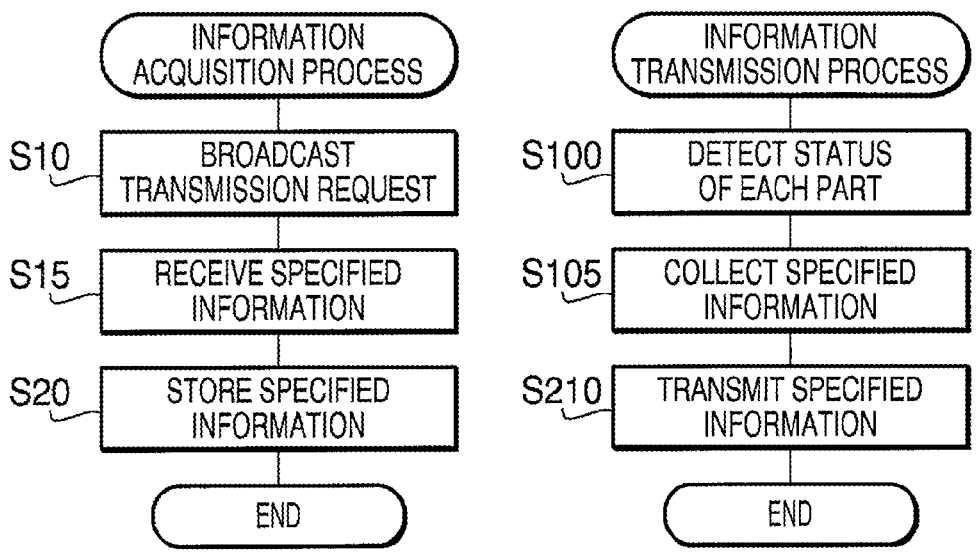
FIG. 5 is a flow chart showing the procedure of an information acquisition process which is executed by a CPU of a printer in the printing system according to at least some illustrative aspects of the invention.
FIG. 6 is a flow chart showing the procedure of an information transmission process which is executed by the CPU of the printer according to at least some illustrative aspects of the invention.

FIG. 5 is a flow chart showing the procedure of an information acquisition process which is executed by the CPU 311 of the printer 3. The CPU 311 executes the information acquisition process at preset time intervals (one minute in the first illustrative embodiment).

As shown in FIG. 5, the printer 3 first broadcasts a transmission request (requesting other printers on the network 5 to transmit "specified information" to the printer 3) to the network 5 according to a prescribed protocol (SNMP (Simple Network Management Protocol) in this illustrative embodiment) (S10). Here, the "specified information" includes the display color and display style that have been set for the background of the screen of each printer (corresponding to the screen 32 of the printer 3), status of each printer (the presence or absence of an error state (e.g. paper jam) and a warning state (e.g. low toner)), the presence or absence of external operation (operation to each printer from outside), etc.

Thereafter, the printer 3 receives the specified information from other printers connected to the network 5 (S15), stores the received specified information in the RAM 313 (S20), and ends the information acquisition process of FIG. 5.

FIG. 6 is a flow chart showing the procedure of an information transmission process which is executed by the CPU 311 of the printer 3. The CPU 311 executes the information transmission process when the aforementioned transmission request is received from another printer.

As shown in FIG. 6, the CPU 311 detects the status of each part of the printer 3 (S100), thereby collects the specified information (S105), transmits the collected specified information to the sender of the transmission request (S110), and ends the information transmission process of FIG. 6.

Figure 7:
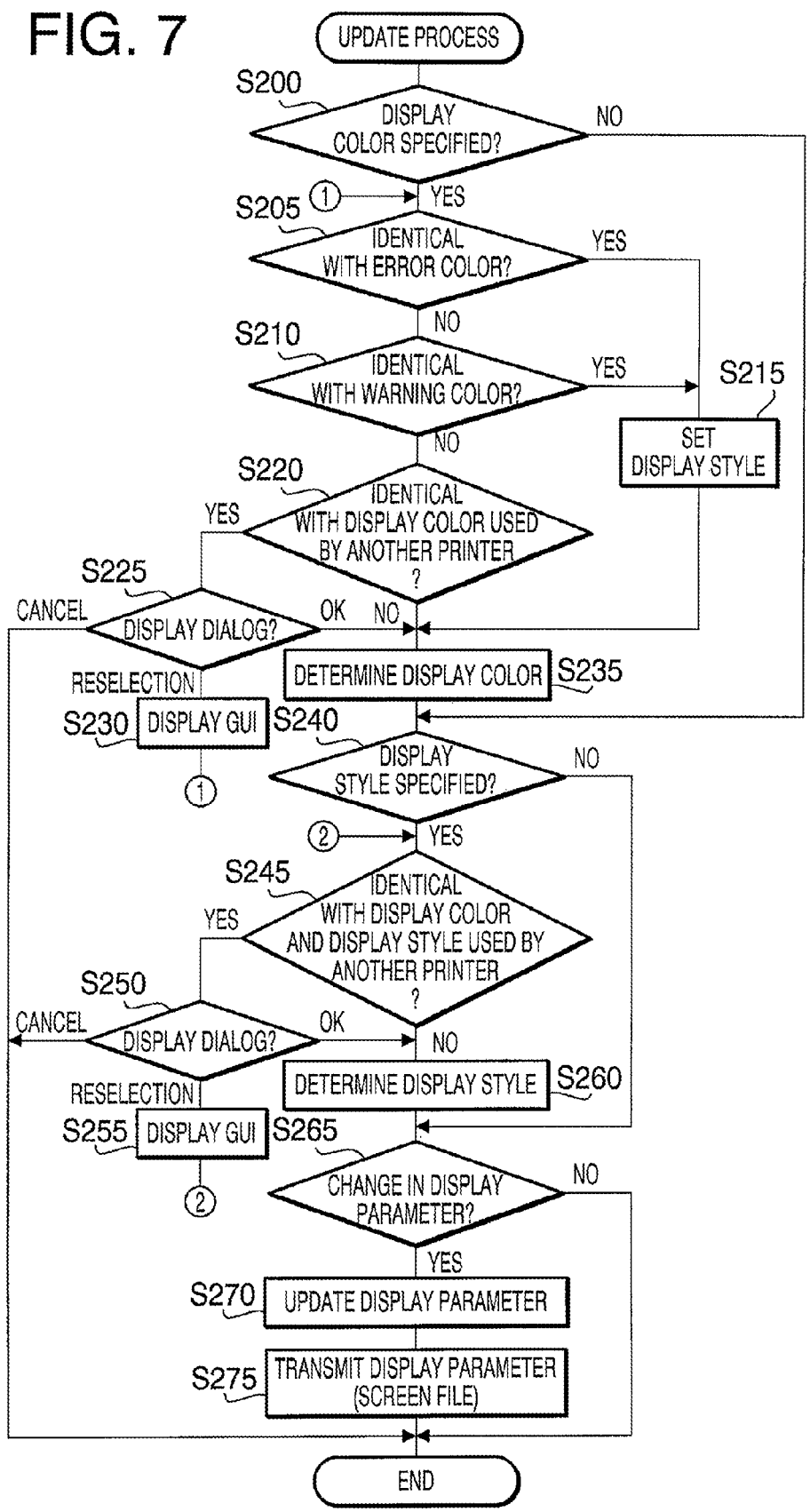
FIG. 7 is a flow chart showing the procedure of an update process which is executed by the CPU of the printer according to at least some illustrative aspects of the invention.

FIG. 7 is a flow chart showing the procedure of an update process which is executed by the CPU 311 of the printer 3. The CPU 311 executes the update process when the aforementioned Web page update request is received from the PC 2.

As shown in FIG. 7, the CPU 311 first judges whether a display color is specified by the display parameter which has been received from the PC 2 and stored in a temporary storage area of the RAM 313 (hereinafter referred to as a "temporary parameter") (S200). The temporary storage area is a storage area reserved in the RAM 313 for temporarily storing the display parameter received from the PC 2.

If no display color is specified by the temporary parameter (S200: NO), the process directly advances to step S240 which will be explained later. If a display color is specified by the temporary parameter (S200: YES), the CPU 311 judges whether the specified display color is identical with an "error color" (red in the first illustrative embodiment) which has previously been specified as a background color of the Web pages and the screen 32 of the printer 3 for indicating the occurrence of the error state (S205). If the specified display color is identical with the error color (S205: YES), the process advances to step S215 which will be explained later.

On the other hand, if the specified display color is different from the error color (S205: NO), the CPU 311 judges whether the specified display color is identical with a "warning color" (e.g. yellow) which has been previously specified as a background color of the Web pages and the screen 32 of the printer 3 for indicating the occurrence of the warning state (S210). If the specified display color is identical with the warning color (S210: YES), the CPU 311 sets a display style (e.g. a blinking mode) that is different from a display style previously specified for indicating the occurrence of the error state or the warning state (e.g. single color filling) to the temporary parameter (S215) and advances to step S235 which will be explained later. Incidentally, in cases where the error color used on the screen 32 is different from the error color used on the Web pages, the display color specified by the temporary parameter may be considered to be identical with the error color in step S205 if the specified display color is identical with either of the two error colors. Similarly, in cases where the warning color used on the screen 32 is different from the warning color used on the Web pages, the display color specified by the temporary parameter may be considered to be identical with the warning color in the step S210 if the specified display color is identical with either of the two warning colors.

On the other hand, if the specified display color is different from the warning color (S210: NO), the CPU 311 refers to the specified information which has been stored in the RAM 313 in the aforementioned information acquisition process and thereby judges whether the specified display color is identical with a display color being used by another printer (S220).

If the specified display color is identical with a display color used by another printer (S220: YES), the CPU 311 instructs the PC 2 to display a dialog indicating that the specified display color is identical with a display color used by another printer (S225).

When cancellation of the specified display color is selected by the user of the PC 2 seeing the dialog (S225: CANCEL), the update process of FIG. 7 is ended immediately.

When reselection of the display color is requested by the user of the PC 2 seeing the dialog (S225: RESELECTION), the CPU 311 instructs the PC 2 to display a GUI (Graphical User Interface) for letting the user reselect the display color (S230). After the display color is reselected (specified) by the user of the PC 2, the process returns to the aforementioned step S205.

When confirmation of the specified display color is selected by the user of the PC 2 seeing the dialog, that is, when the user intentionally confirms the display color being already used by another printer (S225: OK), the process advances to step S235 which will be explained later.

In the step S220, if the specified display color is different from display colors being used by other printers (S220: NO), the CPU 311 determines (finalizes) the specified display color as the display color specified by the temporary parameter, that is, finally specifies the display color in the temporary parameter (S235).

Subsequently, the CPU 311 judges whether a display style is specified by the temporary parameter (S240). If no display style is specified by the temporary parameter (S240: NO), the process directly advances to step S265 which will be explained later.

On the other hand, if a display style is specified by the temporary parameter (S240: YES), the CPU 311 refers to the "specified information" which has been stored in the RAM 313 in the aforementioned information acquisition process and thereby judges whether the combination of the specified display color and display style is identical with the combination of a display color and a display style being used by another printer (S245).

If the combination of the specified display color and display style is identical with the combination of a display color and a display style being used by another printer (S245: YES), the CPU 311 instructs the PC 2 to display a dialog indicating that the specified display style is identical with a display style used by another printer (S250).

When cancellation of the specified display style is selected by the user of the PC 2 seeing the dialog (S250: CANCEL), the update process of FIG. 7 is ended immediately.

When reselection of the display style is requested by the user of the PC 2 seeing the dialog (S250: RESELECTION), the CPU 311 instructs the PC 2 to display a GUI for letting the user reselect the display style (S255). After the display style is reselected (specified) by the user of the PC 2, the process returns to the aforementioned step S245.

When confirmation of the specified display style is selected by the user of the PC 2 seeing the dialog, that is, when the user intentionally confirms the combination of the display color and the display style being already used by another printer (S250: OK), the process advances to step S260 which will be explained later.

In the step S245, if the combination of the specified display color and display style is different from combinations being used by other printers (S245: NO), the CPU 311 determines (finalizes) the specified display style as the display style specified by the temporary parameter, that is, finally specifies the display style in the temporary parameter (5260).

Subsequently, the CPU 311 compares a display parameter stored in a parameter setting area of the nonvolatile memory 314 with the temporary parameter and thereby judges whether there is a change in the display parameter, that is, whether the display parameter stored in the parameter setting area is different from the temporary parameter (S265). The parameter setting area is a storage area reserved in the nonvolatile memory 314 for storing the display parameter specifying the display color and the display style to be set to the background of the screen 32. The display unit 317 controls the screen 32 according to the display parameter stored in the parameter setting area, by which the background of the screen 32 is displayed in the display color and the display style specified by the display parameter.

Incidentally, while the parameter setting area is reserved in the nonvolatile memory 314 in the printer 3 so that the display on the screen 32 after each restart of the printer 3 will be the same as that immediately before the restart, it is also possible to temporarily copy the display parameter stored in the nonvolatile memory 314 into the RAM 313 and use the display parameter in the RAM 313 for processes. In cases where the equality in the display before and after the restart is not required, it is unnecessary to use the nonvolatile memory 314.

If there is no change in the display parameter (S265: NO), the update process of FIG. 7 is ended immediately. If there is a change in the display parameter (S265: YES), the CPU 311 updates the display parameter stored in the parameter setting area by storing the temporary parameter in the parameter setting area (S270), transmits a screen file in the HTML format incorporating the updated display parameter to the PC 2 so as to let the PC 2 display a screen in which the aforementioned display color and display style of Web pages (specifically, the display color and display style of the background of the status display frame 62) have been updated (S275), and ends the update process of FIG. 7.

FIG. 9 is a table showing an example of a table stored in the nonvolatile memory 314 or the RAM 313 to be used for the update process, in which the display parameter, an operation color, the warning color and the error color regarding each printer are stored.

As shown in FIG. 9, each printer is identified in the table by a serial number. The table stores the display parameter, the operation color, the warning color and the error color regarding each printer. In FIG. 9, "ABC1234" is the serial number of the printer 3, "ABC1238" is the serial number of the printer 4, and "ABC1111" is the serial number of another printer (not shown). IP addresses, MAC addresses, etc. may also be used, instead of the serial numbers, for the identification of the printers. However, the use of serial numbers or MAC addresses (which are never changed) is advantageous since the use of the same number/address for two or more printers can be avoided. Incidentally, the table may be prepared in various ways as long as necessary information is understood by the CPU 311 of each printer. For example, the table may be stored separately in regard to each printer, or separated in regard to the display color and/or display style.

Figure 10:
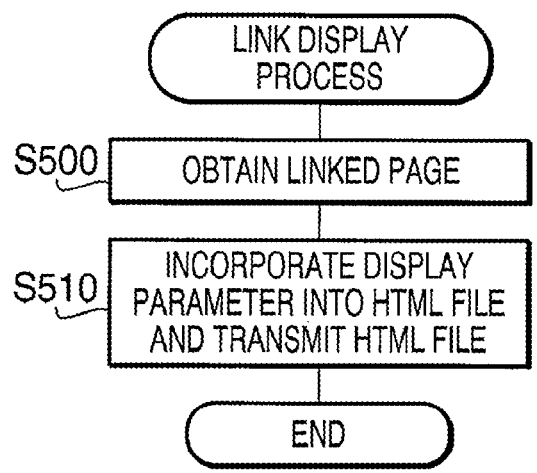
FIG. 10 is a flow chart showing the procedure of a link display process which is executed by the CPU of the printer according to at least some illustrative aspects of the invention.

FIG. 10 is a flow chart showing the procedure of a link display process which is executed by the CPU 311 of the printer 3. The CPU 311 executes the link display process when a link being displayed on a Web page is selected by the user of the PC 2 and a URL in HTTP specifying the link (a Web page) is received from the PC 2.

As shown in FIG. 10, the CPU 311 first obtains an HTML file for reproducing the Web page specified by the received URL from the nonvolatile memory 314, or dynamically generates the HTML file (S500). Thereafter, the CPU 311 incorporates the display parameter stored in the parameter setting area into the HTML file and transmits the HTML file (in which the display parameter has been incorporated) to the PC 2 by HTTP (S510) and ends the link display process of FIG. 10.

Figure 11:
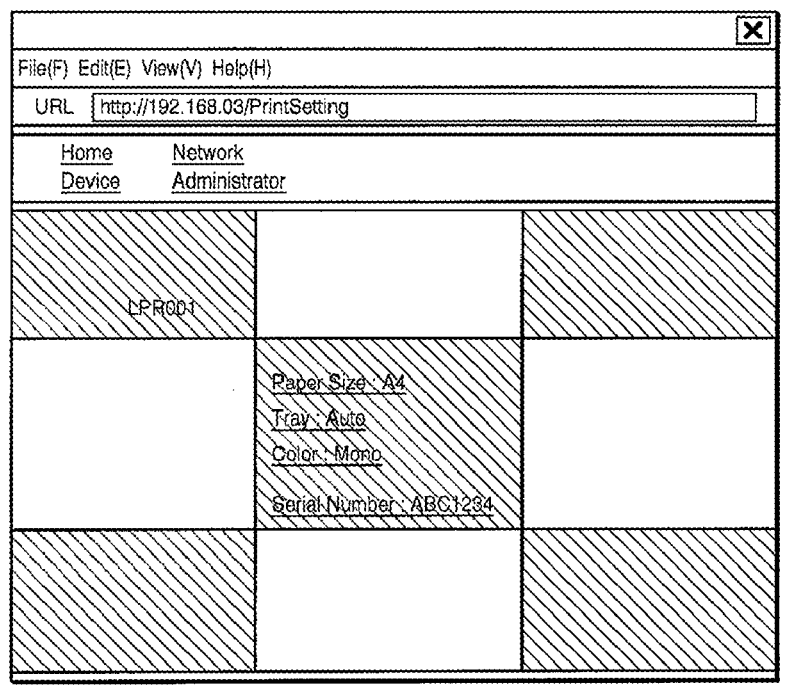
FIG. 11 is an explanatory drawing showing an example of a Web page which is displayed when a link "Print Setting" is selected (e.g. clicked) on the screen of FIG. 4 according to at least some illustrative aspects of the invention.

By the above process, the background of the linked Web page can be set in the same display color and display style as the background of the screen 32 of the printer 3 as shown in FIG. 11, for example. FIG. 11 is an explanatory drawing showing an example of a Web page which is displayed when a link "Print Setting" is selected (e.g. clicked) on the screen of FIG. 4.

Figure 8:
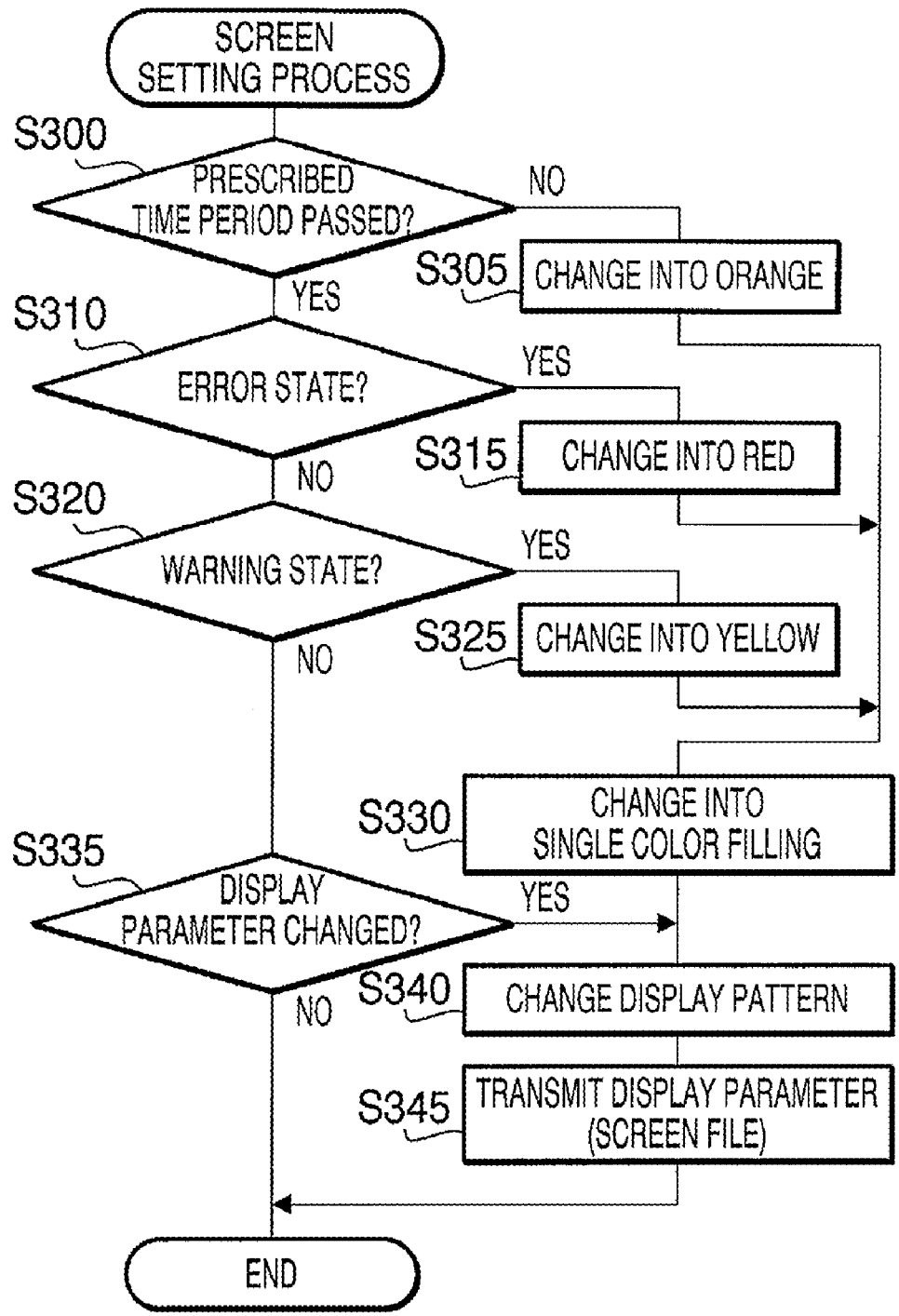
FIG. 8 is a flow chart showing the procedure of a screen setting process which is executed by the CPU of the printer according to at least some illustrative aspects of the invention.

FIG. 8 is a flow chart showing the procedure of a screen setting process which is executed by the CPU 311 of the printer 3. The CPU 311 executes the screen setting process at preset time intervals.

As shown in FIG. 8, the CPU 311 first judges whether the operation switches are being operated (during external operation) or were last operated within a prescribed time period (ten seconds in the first illustrative embodiment) (S300). If the operation switches are in operation or were operated within the prescribed time period (S300: NO), the CPU 311 changes the display color in the display parameter (the display color specified by the display parameter, that is, a part of the display parameter specifying a display color) stored in the parameter setting area of the RAM 313 into "orange" (i.e. the operation color) as shown in FIG. 12A (S305), and thereafter advances to step S330 which will be explained later.

On the other hand, if the operation switches are not in operation and the prescribed time period has passed since the operation switches were operated (S300: YES), the CPU 311 judges whether the error state is detected by checking the status of each part of the printer 3 (S310). If the error state is detected (S310: YES), the CPU 311 changes the display color in the display parameter stored in the parameter setting area into "red" (i.e. the error color) as shown in FIG. 12C (S315), and thereafter advances to the step S330 which will be explained later.

On the other hand, if the error state is not detected (S310: NO), the CPU 311 judges whether the warning state is detected (S320). If the warning state is detected (S320: YES), the CPU 311 changes the display color in the display parameter stored in the parameter setting area into "yellow" (i.e. the warning color) as shown in FIG. 12B (S325) while changing the display style in the display parameter (the display style specified by the display parameter, that is, a part of the display parameter specifying a display style) stored in the parameter setting area into the "single color filling" (S330), and thereafter advances to step S340 which will be explained later.

On the other hand, if the warning state is not detected (S320: NO), the CPU 311 compares the display color and display style that has been set for the screen 32 (i.e. the display parameter stored in the parameter setting area) with a temporary parameter (a display parameter indicating the display color and display style at the start of the screen setting process) stored in the temporary storage area and thereby judges whether the display parameter has been changed, that is, whether the display parameter is different from the temporary parameter (S335). If the display parameter has not been changed (S335: NO), the screen setting process of FIG. 8 is ended.

On the other hand, if the display parameter has been changed (S335: YES), the CPU 311 changes the display pattern 32 of the screen 32 according to the display parameter stored in the parameter setting area (S340), transmits a screen file in the HTML format incorporating the updated display parameter to the PC 2 so as to let the PC 2 display a screen in which the aforementioned display color and display style of Web pages (specifically, the display color and display style of the background of the status display frame 62) have been updated (S345), and ends the screen setting process of FIG. 8. Incidentally, FIGS. 12D, 12E and 12F are explanatory drawings showing examples of screens displayed on the display 22 of the PC 2 by this process.

FIG. 13 is a flow chart showing the procedure of a PC-side screen setting process which is executed by the CPU 211 of the PC 2. The CPU 211 executes the PC-side screen setting process when a screen file in the HTML format is received from the printer 3.

As shown in FIG. 13, the CPU 211 receives a screen file in the HTML format from the printer 3 (S600), displays a Web page screen according to the received screen file in the HTML format (S610), and ends the PC-side screen setting process of FIG. 13. By the process, a Web page having a background in the same display color and display style as the background of the screen 32 of the printer 3 can be displayed by the PC 2.

Figure 14:
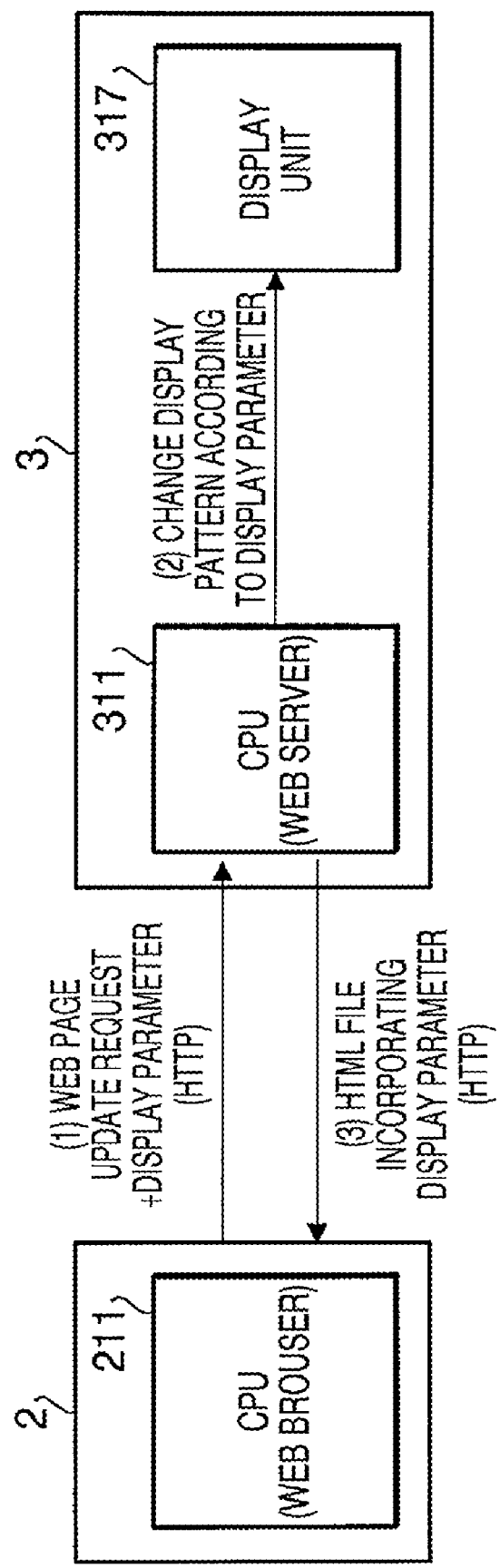
FIG. 14 is an explanatory drawing schematically showing the operation of the PC and the printer in the printing system according to at least some illustrative aspects of the invention.

To summarize the above explanation of the printing system 1 of the first illustrative embodiment referring to FIG. 14, for example, when the printer 3 is designated as the operation target of the PC 2, the CPU 211 of the PC 2 transmits the Web page update request and the display parameter specifying the selected display color and/or display style to the printer 3 (1). The CPU 311 of the printer 3 changes the display parameter set to the printer 3 according to the display parameter received from the PC 2 and thereby lets the display unit 317 change the display pattern of the background of the screen 32 according to the changed display parameter (2) while transmitting a screen file in the HTML format (in which the same display parameter has been incorporated) to the PC 2 (3). The CPU 211 of the PC 2 updates the Web browser screen 6 and thereby changes the display pattern of the background of the status display frame 62 according to the screen file in the HTML format received from the printer 3. Incidentally, FIG. 14 is an explanatory drawing schematically showing the operation of the PC 2 and the printer 3 in the printing system 1 of the first embodiment.

Figure 15:
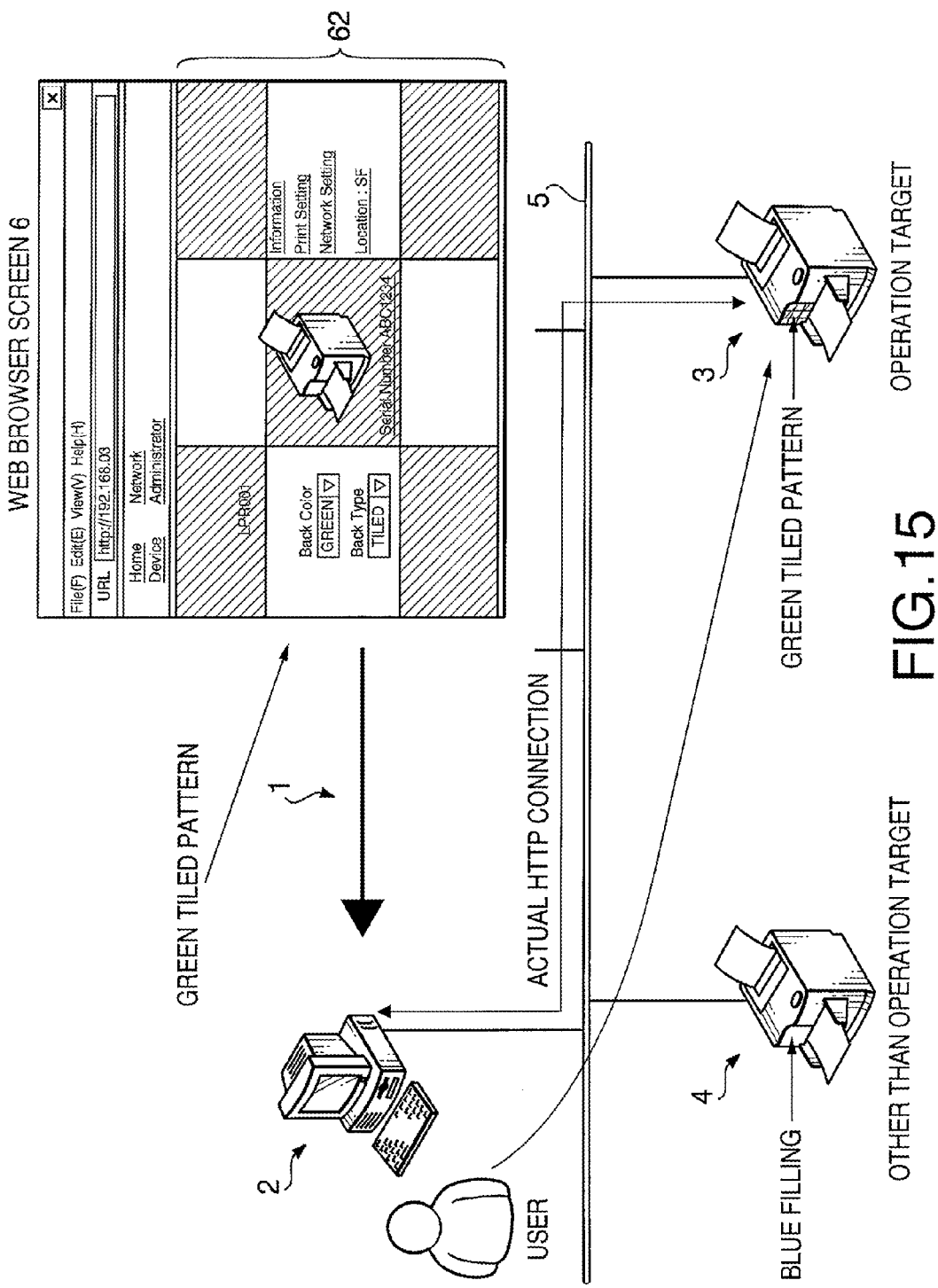
FIG. 15 is an explanatory drawing showing the effect of the printing system according to at least some illustrative aspects of the invention.

Therefore, in the printing system 1 of the first illustrative embodiment, even when the printers 3 and 4 are of the same type (model), a display pattern identical with that of the background of the status display frame 62 of the Web browser screen 6 displayed by the PC 2 is set to the background of the screen 32 of the printer 3 as shown in FIG. 15, by which the user of the PC 2 can recognize at a glance that the printer 3 is the printer designated as the operation target. Incidentally, FIG. 15 is an explanatory drawing showing the effect of the printing system 1 in accordance with the first illustrative embodiment.

As described above, with the printing system 1 in accordance with the first illustrative embodiment, the user of the PC 2 is allowed to recognize the printer designated as the operation target of the PC 2 at a glance even when printers of the same type (model) are connected to the network 5.

On the Web browser screen 6 which is displayed on the display 22 of the PC 2, the background of the status display frame 62 (for displaying the status information on a printer) is regarded as the target of the display pattern setting in the printing system 1 of the first illustrative embodiment, by which the user of the PC 2 can recognize the printer designated as the operation target of the PC 2 at a glance while operating the printer or checking the status of the printer on the Web browser screen 6.

In each printer (3, 4) in the printing system 1 of the first illustrative embodiment, the background of the screen (32, 42) having sufficiently high viewability for displaying the status information on the printer is regarded as the target of the display pattern setting, by which the user of each printer (3, 4) can check the status of the printer with high viewability while easily recognizing the printer designated as the operation target of the PC 2.

The status display frame 62 on the Web browser screen 6 displayed by the PC 2 of the printing system 1 of the first illustrative embodiment is provided with the list boxes 621 and 622, by which the user of the PC 2 is allowed to select desired display patterns.

Even when a display pattern identical with a display pattern being used by a printer other than the operation target of the PC 2 is selected for the operation target printer (the printer designated as the operation target of the PC 2) in the printing system 1 of the first illustrative embodiment, a different display pattern is set to the screen of the operation target printer and to the status display frame 62 of the Web browser screen 6 displayed by the PC 2, by which the user can be prevented from erroneously recognizing a different printer as the operation target printer.

Similarly, even when a display color identical with the display color indicating the occurrence of the error state or warning state is selected for the operation target printer (the printer designated as the operation target of the PC 2) in the printing system 1 of the first illustrative embodiment, the display pattern for the operation target printer is set at a display style different from the display style indicating the error state or warning state, by which the user is prevented from erroneously recognizing the display pattern that has been set for indicating the occurrence of the error state or warning state as the display pattern that has been set for identifying the operation target printer. Further, even in case where the error state or warning state occurs to a printer other than the operation target printer when the user (who has selected the display color for the error state or warning state as the display color for the operation target printer) is about to recognize the operation target printer, the user is prevented from erroneously recognizing the printer in the error state or warning state as the operation target printer.

When the error state, the warning state or the external operation state (in which the operation switches of the printer are being operated) occurs to a printer (3, 4) in the printing system 1 of the first illustrative embodiment, a display pattern corresponding to the state is set to the screen (32, 42) of the printer (3, 4), by which the user can recognize the occurrence of the error state, warning state or external operation state to a printer at a glance.

Further, when the error state, the warning state or the external operation state ends in a printer (3, 4) in the printing system 1 of the first illustrative embodiment, the display pattern which has been set to the screen (32, 42) depending on the state is canceled, by which the user can recognize the ending of the error state, warning state or external operation state of the printer at a glance.

Second Illustrative Embodiment

In the following, a printing system 1A as an operation target identification system in accordance with a second illustrative embodiment of the present invention will be described in detail.

The printing system 1A of the second illustrative embodiment differs from the printing system 1 of the first illustrative embodiment in the settings of the printers 3 and 4, and thus the difference from the first illustrative embodiment will be explained below in detail while omitting repeated explanation of elements in common with the first illustrative embodiment.

In the PC 2 of the printing system 1A of the second illustrative embodiment, an application program for operating the printers 3 and 4 by SNMP (Simple Network Management Protocol) is installed instead of the Web browser program in the first illustrative embodiment. In the printers 3 and 4 of the printing system 1A of the second illustrative embodiment, an agent program for receiving the operation from the application program by SNMP is installed instead of the Web server program in the first illustrative embodiment.

In the second illustrative embodiment, the information acquisition process and the update process explained in the first illustrative embodiment are executed by the PC 2, while the information transmission process and the screen setting process explained in the first illustrative embodiment are executed by the printers 3 and 4.

Figure 18:
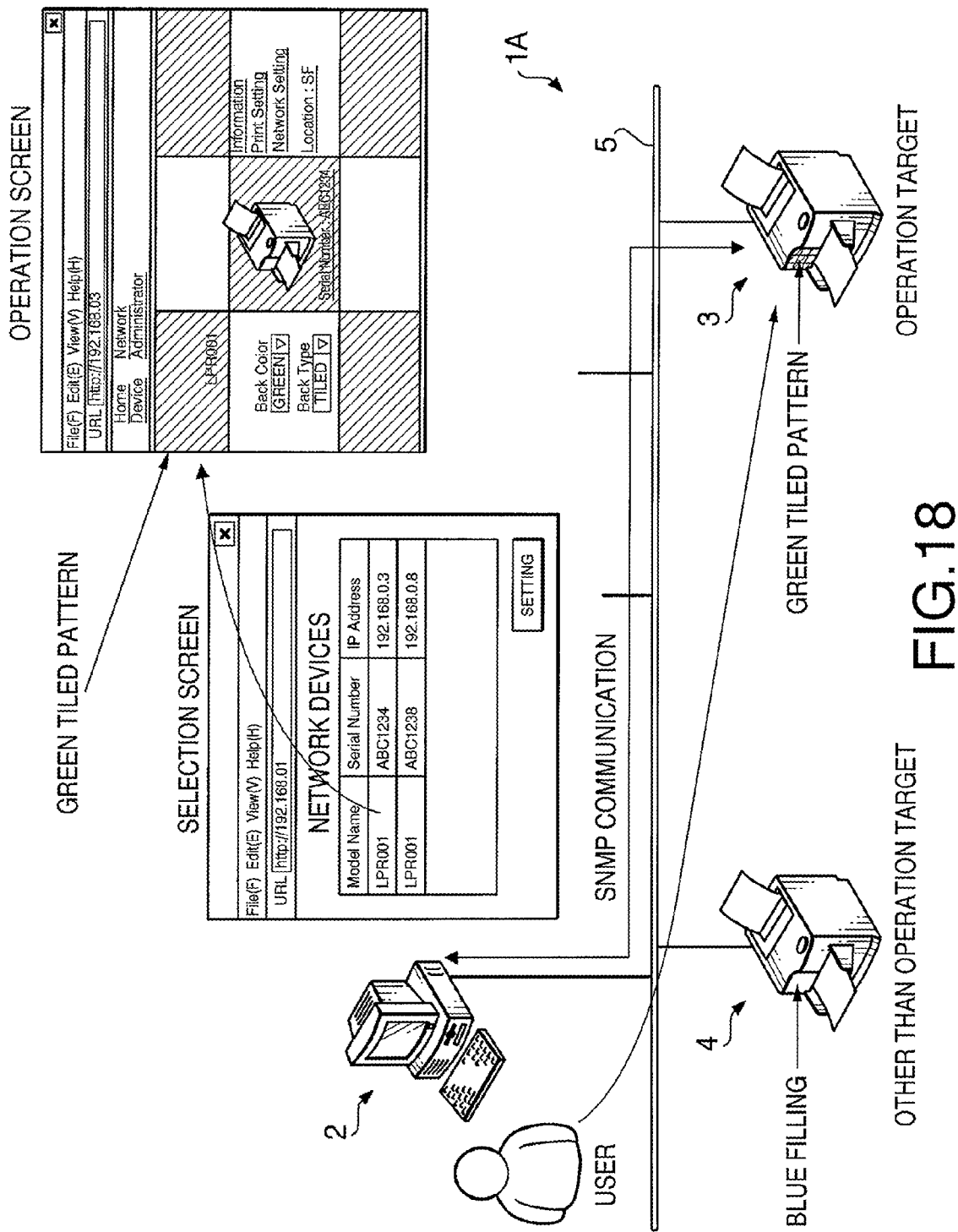
FIG. 18 is an explanatory drawing showing the effect of the printing system according to at least some illustrative aspects of the invention.

After activating the aforementioned application program, the CPU 211 of the PC 2 displays a selection screen, on which the model names, serial numbers and IP addresses of the printers 3 and 4 are indicated as shown in FIG. 18, on the display 22 based on information obtained and stored previously or information newly obtained by the information acquisition process.

When one of the printers 3 and 4 is selected from the selection screen by use of the keyboard 23 or the mouse as the operation target of the PC 2, the CPU 211 displays an operation screen similar to the aforementioned status display frame 62 (see FIG. 18) on the display 22 based on information obtained and stored previously or information newly obtained by the information acquisition process.

When a display color or a display style is selected from the operation screen, the CPU 211 executes the aforementioned update process.

Incidentally, the information acquisition process in the second illustrative embodiment is slightly different from the information acquisition process in the first illustrative embodiment as follows. First, the information acquisition process in the second illustrative embodiment is executed not by the CPU 311 of the printer 3 but by the CPU 211 of the PC 2.

Second, not only the "specified information" specified in the first illustrative embodiment but also information about the "operation color" indicating the external operation state of each printer, the "error color" indicating the error state of each printer and the "warning color" indicating the warning state of each printer is requested as the "specified information" by the transmission request broadcasted in the information acquisition process of the second illustrative embodiment.

Third, the CPU 211 executes the information acquisition process simultaneously with the activation of the application program, and thereafter executes the information acquisition process periodically or properly when information on the printers has become necessary.

The information transmission process in the second illustrative embodiment is a process similar to the information transmission process in the first illustrative embodiment. In the second illustrative embodiment, each printer (3, 4) transmits the information specified by the PC 2 as the specified information to the PC 2.

The update process in the second illustrative embodiment differs from the update process in the first illustrative embodiment as follows. First, the update process in the second illustrative embodiment is executed not by the CPU 311 of the printer 3 but by the CPU 211 of the PC 2. The CPU 211 executes the update process when a display color is specified on the operation screen by use of the keyboard 23 or the mouse.

In the step S200 in FIG. 7, the CPU 211 judges whether a display color has been specified on the operation screen by use of the keyboard 23 or the mouse. In the second illustrative embodiment, the "temporary parameter" means a display parameter that is specified on the operation screen, and the "temporary storage area" means a storage area reserved in the RAM 213 for temporarily storing the display parameter.

In the step S205, the CPU 211 judges whether the specified display color is identical with the previously obtained "error color" indicating the error state of the printer designated as the operation target of the PC 2.

In the step S210, the CPU 211 judges whether the specified display color is identical with the previously obtained "warning color" indicating the warning state of the printer designated as the operation target of the PC 2.

Incidentally, in cases where an error color used by the application program for indicating the error state is different from the error color used by the printer, the specified display color may be considered to be identical with the error color in the step S205 if the specified display color is identical with either of the two error colors. Similarly, in cases where a warning color used by the application program for indicating the warning state is different from the warning color used by the printer, the specified display color may be considered to be identical with the warning color in the step S210 if the specified display color is identical with either of the two warning colors.

In the step S220, the CPU 211 judges whether the specified display color is identical with a display color being used by a printer other than the printer designated as the operation target of the PC 2 based on the previously obtained information. In the step S240, the CPU 211 judges whether a display style has been specified on the operation screen by use of the keyboard 23 or the mouse. In the step S245, the CPU 211 judges whether the specified display style is identical with a display style being used by a printer other than the printer designated as the operation target of the PC 2 based on the previously obtained information.

In the step S265, the CPU 211 compares the previously obtained display color and display style being used by the operation target printer (the printer designated as the operation target of the PC 2) with the temporary parameter (at this point) and thereby judges whether there is a change in the display parameter. In the step S270, the CPU 211 changes the display color and display style of the background of the operation screen into those specified by the temporary parameter. In the step S275, the CPU 211 transmits the changed display parameter to the operation target printer according to SNMP.

Figure 16:
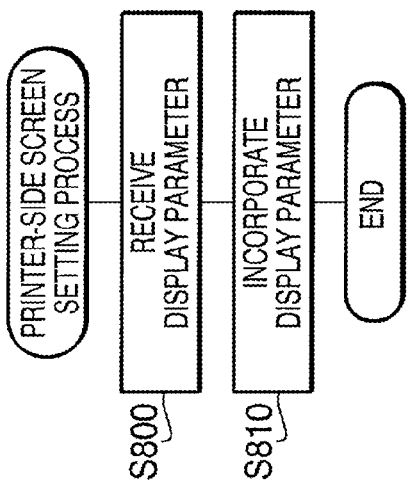
FIG. 16 is a flow chart showing the procedure of a printer-side screen setting process which is executed by a CPU of a printer in a printing system as an operation target identification system according to at least some illustrative aspects of the invention.

As shown in FIG. 16, the CPU of the operation target printer (the CPU 311 of the printer 3 in this illustrative embodiment) receives the display parameter from the PC 2 according to SNMP (S800) and sets the display pattern of the screen 32 in the display color and display style corresponding to the received display parameter (S810). Incidentally, FIG. 16 is a flow chart showing the procedure of a printer-side screen setting process which is executed by the CPU 311 of the printer 3.

The link display process in the second illustrative embodiment differs from the link display process in the first illustrative embodiment as follows. First, the link display process in the second illustrative embodiment is executed not by the CPU 311 of the printer 3 but by the CPU 211 of the PC 2. In the step S500 in FIG. 10, the CPU 211 obtains a link operation screen stored in the HDD 214 of the PC 2. In the step S510, the CPU 211 changes the display color and display style of the background of the link operation screen into those specified by the temporary parameter (display parameter).

The screen setting process in the second illustrative embodiment is slightly different from the screen setting process in the first illustrative embodiment as follows. In the step S345 in FIG. 8, the CPU 311 of the printer 3 transmits the updated display parameter (the display parameter changed in S340) to the PC 2 according to SNMP. The PC-side screen setting process in the first illustrative embodiment does not exist in the second illustrative embodiment.

Figure 17:
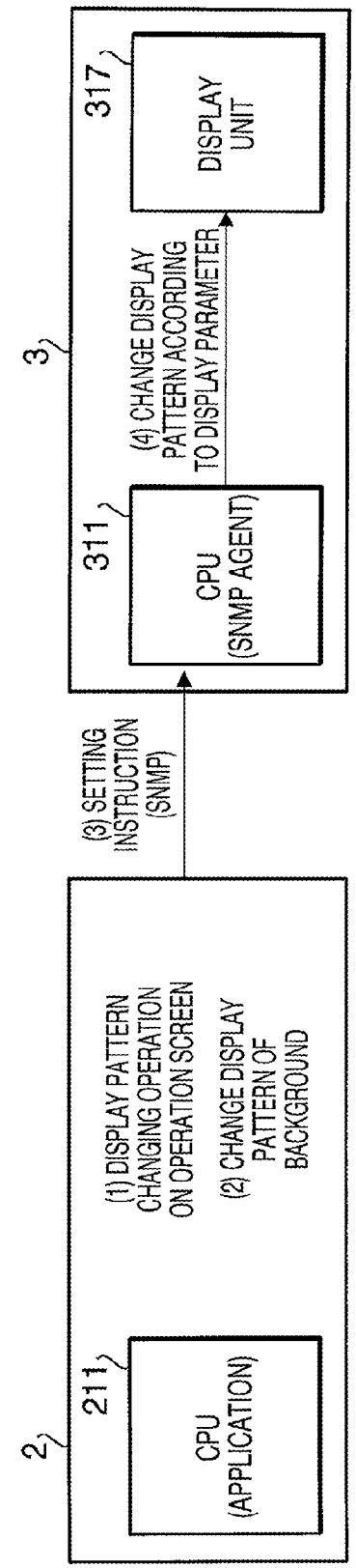
FIG. 17 is an explanatory drawing schematically showing the operation of a PC and the printer in the printing system according to at least some illustrative aspects of the invention.

To summarize the above explanation of the printing system 1A of the second illustrative embodiment referring to FIG. 17, for example, when an operation for changing the display pattern of the background is performed on the operation screen displayed by the PC 2 in the case where the printer 3 has been designated as the operation target of the PC 2 (1), the CPU 211 of the PC 2 changes the display pattern of the background of the operation screen (2) while transmitting a setting instruction (requesting the printer 3 to set the changed display pattern thereto) to the printer 3 (3). The CPU 311 of the printer 3 lets the display unit 317 change the display pattern of the background of the screen 32 according to the setting instruction (4). Incidentally, FIG. 17 is an explanatory drawing schematically showing the operation of the PC 2 and the printer 3 in the printing system 1A of the second illustrative embodiment.

Therefore, in the printing system 1A of the second illustrative embodiment, even when the printers 3 and 4 are of the same type (model), a display pattern identical with that of the background of the operation screen displayed by the PC 2 is set to the background of the screen 32 of the printer 3 as shown in FIG. 18, by which the user of the PC 2 can recognize at a glance that the printer 3 is the printer designated as the operation target. Incidentally, FIG. 18 is an explanatory drawing showing the effect of the printing system 1A in accordance with the second illustrative embodiment.

As described above, the printing system 1A of the second illustrative embodiment achieves effects similar to those of the printing system 1 of the first illustrative embodiment.

Third Illustrative Embodiment

In the following, a printing system 1B as an operation target identification system in accordance with a third illustrative embodiment of the present invention will be described in detail.

Figure 19:
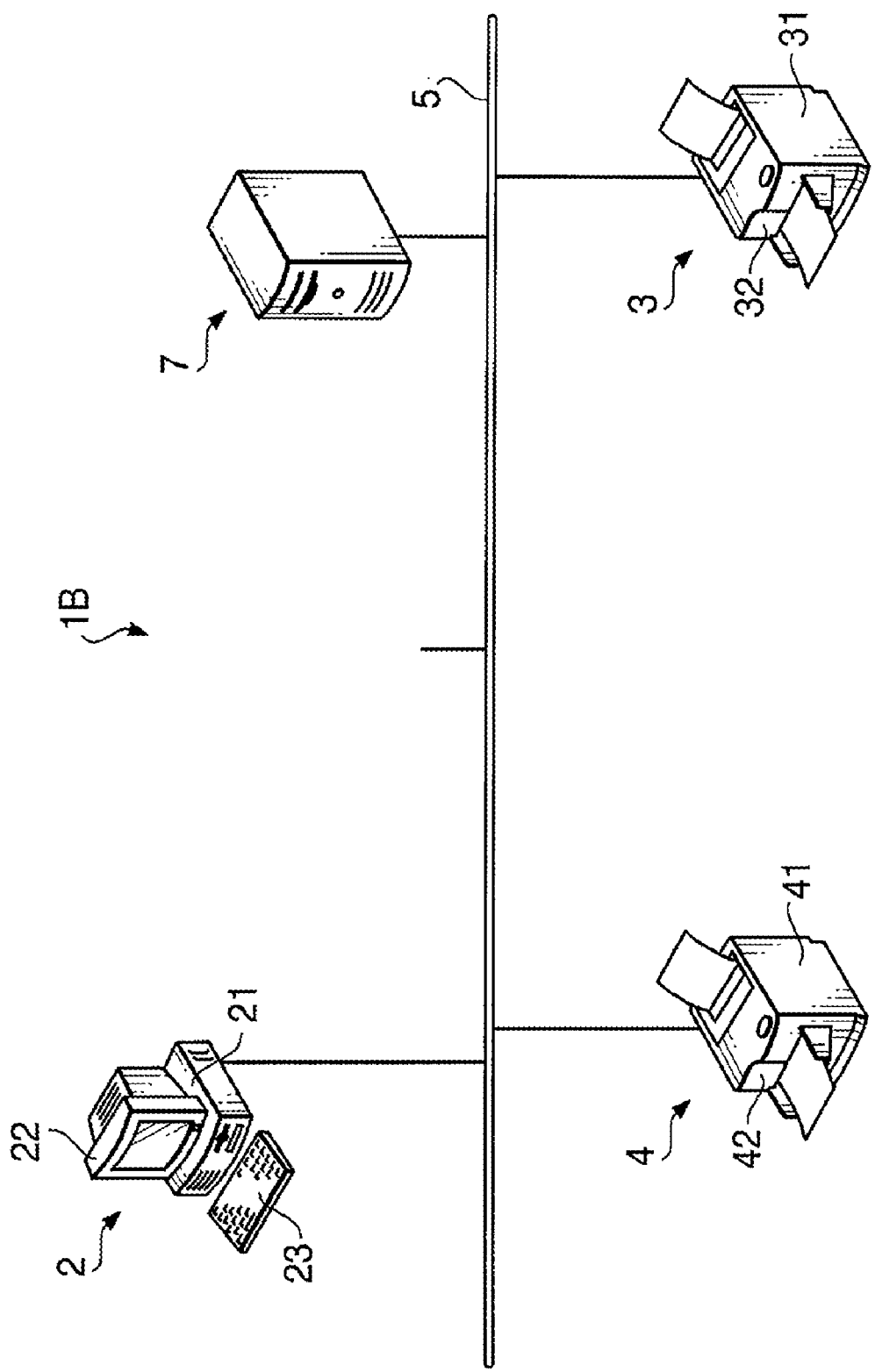
FIG. 19 is a schematic diagram showing a printing system as an operation target identification system in accordance with a third embodiment according to at least some illustrative aspects of the invention.

FIG. 19 is a schematic diagram showing the printing system 1B in accordance with the third illustrative embodiment. As shown in FIG. 19, the printing system 1B of the third illustrative embodiment is formed by connecting a server 7 to the network 5 in the printing system 1 of the first illustrative embodiment.

In the printing system 1B of the third illustrative embodiment, the settings of the PC 2 and the printers 3 and 4 are different from those in the first illustrative embodiment. Therefore, the difference from the first illustrative embodiment will be explained below in detail while omitting repeated explanation of elements in common with the first embodiment.

In the printers 3 and 4 of the printing system 1B of the third illustrative embodiment, an agent program for receiving operations from an application program according to SNMP is installed instead of the Web server program in the first illustrative embodiment.

In the third illustrative embodiment, the information acquisition process and the update process explained in the first illustrative embodiment are executed by the server 7, while the information transmission process and the screen setting process explained in the first illustrative embodiment are executed by the printers 3 and 4.

When an IP address or a URL (specifying a node name) of the server 7 is received through the keyboard 23 or the mouse, the CPU 211 of the PC 2 activates the Web browser program. In the case where a URL is received, the CPU 211 inquires of a DNS server about an IP address corresponding to the inputted URL (i.e. the IP address of the server 7) according to HTTP, obtains the IP address from the DNS server, and transmits a request for a Web page to the obtained IP address as the destination (i.e. the server 7). In the case where an IP address is received, the CPU 211 transmits the request for the Web page to the received IP address as the destination (i.e. the server 7). In response to the request, the server 7 generates an HTML file of a "selection screen" (on which the model names, serial numbers and IP addresses of the printers 3 and 4 are indicated) based on information obtained and stored previously or information newly obtained by the information acquisition process, and transmits the generated HTML file to the PC 2 by HTTP. The PC 2 receiving the HTML file from the server 7 displays a Web page according to the HTML file (the selection screen) on a Web browser screen being displayed on the display 22 (see FIG. 22).

When one of the printers 3 and 4 is designated on the selection screen as the operation target of the PC 2 by use of the keyboard 23 or the mouse, the CPU 211 transmits a request for a Web page (an operation screen for operating the designated printer) to the server 7. In response to the request, the server 7 generates an HTML file of the operation screen for operating the designated printer based on information obtained and stored previously or information newly obtained by the information acquisition process, and transmits the generated HTML file to the PC 2 by HTTP.

The PC 2 receiving the HTML file displays a Web page according to the HTML file on the Web browser screen being displayed on the display 22. Incidentally, the Web browser screen in the third illustrative embodiment is totally the same as that in the first illustrative embodiment (see FIG. 22).

When a display color or a display style is selected on the Web browser screen, the CPU 211 of the PC 2 transmits a Web page update request to the server 7 together with a display parameter specifying the selected display color or display style.

Figure 20:
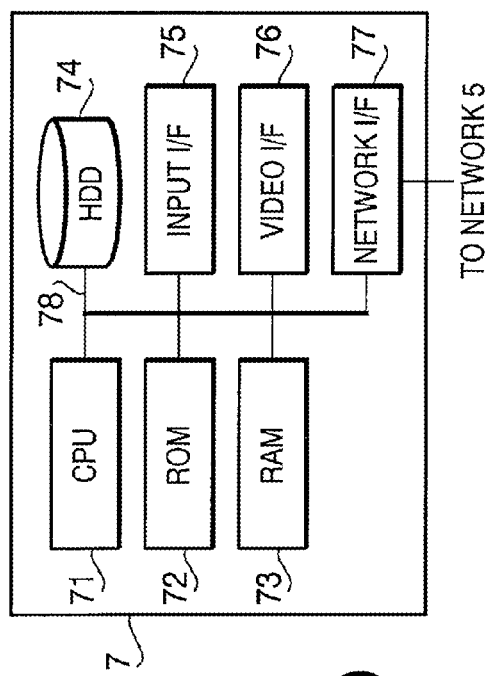
FIG. 20 is a block diagram showing the internal composition of a server included in the printing system of FIG. 19.

FIG. 20 is a block diagram showing the internal composition of the server 7. As shown in FIG. 20, the server 7 includes a CPU 71 for executing various processes to be performed by the server 7, a ROM 72 storing data such as a startup program (BIOS) which is run by the CPU 71 at the startup of the server 7, a RAM 73 which is used as a storage area when the CPU 71 executes various processes, an HDD 74 storing data (e.g. an operating system, a Web server program for letting the server 7 function as a Web server, an application program for operating the printers 3 and 4 by SNMP, and programs for various processes to be executed by the CPU 71), an input I/F 75 for the inputting of input signals (supplied from a keyboard (not shown), mouse (not shown), etc. connected to the server 7) to the CPU 71, a video I/F 76 for letting a not shown display (connected to the server 7) display screens according to instructions from the CPU 71, and a network I/F 77 which is connected to the network 5 for connecting the CPU 71 with other devices connected to the network 5.

In the server 7, the above components are connected together by a signal bus 78. The CPU 71 of the server 7 activates the application program at the startup of the server 7 or after the startup. The information acquisition process in the third illustrative embodiment differs from the information acquisition process in the first illustrative embodiment as follows. First, the information acquisition process in the third illustrative embodiment is executed not by the CPU 311 of the printer 3 but by the CPU 71 of the server 7.

Second, not only the "specified information" specified in the first illustrative embodiment but also information about the "operation color" indicating the external operation state of each printer, the "error color" indicating the error state of each printer and the "warning color" indicating the warning state of each printer is requested as the "specified information" by the transmission request broadcasted in the information acquisition process of the second illustrative embodiment.

Third, the CPU 71 executes the information acquisition process simultaneously with the activation of the application program, and thereafter executes the information acquisition process periodically or properly when information on the printers has become necessary.

The information transmission process in the third illustrative embodiment is a process similar to the information transmission process in the first illustrative embodiment. In the third illustrative embodiment, each printer (3, 4) transmits the information specified by the server 7 as the specified information to the server 7.

The update process in the third illustrative embodiment differs from the update process in the first illustrative embodiment as follows. First, the update process in the third illustrative embodiment is executed not by the CPU 311 of the printer 3 but by the CPU 71 of the server 7. The "temporary storage area" in the third illustrative embodiment means a storage area reserved in the RAM 73 for temporarily storing the display parameter. The CPU 71 executes the update process when the aforementioned Web page update request is received from the PC 2.

In the step S200 in FIG. 7, the CPU 71 judges whether a display color is specified by the display parameter attached to the Web page update request received from the PC 2. In the step S205, the CPU 71 judges whether the specified display color is identical with the previously obtained "error color" indicating the error state of the printer designated as the operation target of the PC 2. In the step S210, the CPU 71 judges whether the specified display color is identical with the previously obtained "warning color" indicating the warning state of the printer designated as the operation target of the PC 2.

Incidentally, in cases where an error color used on Web pages for indicating the error state is different from the error color used by the printer, the specified display color may be considered to be identical with the error color in the step S205 if the specified display color is identical with either of the two error colors. Similarly, in cases where a warning color used on Web pages for indicating the warning state is different from the warning color used by the printer, the specified display color may be considered to be identical with the warning color in the step S210 if the specified display color is identical with either of the two warning colors.

In the step S220, the CPU 71 judges whether the specified display color is identical with a display color being used by a printer other than the printer designated as the operation target of the PC 2 based on the previously obtained information. In the step S240, the CPU 71 judges whether a display style has been specified by the temporary parameter (at this point).

In the step S245, the CPU 71 judges whether the specified display style is identical with a display style being used by a printer other than the printer designated as the operation target of the PC 2 based on the previously obtained information.

In the step S265, the CPU 71 compares the previously obtained display color and display style being used by the operation target printer (the printer designated as the operation target of the PC 2) with the temporary parameter (at this point) and thereby judges whether there is a change in the display parameter.

In the step S270, the CPU 71 updates the display parameter for the operation target printer according to the temporary parameter at this point, and transmits a screen file in the HTML format incorporating the updated display parameter to the PC 2.

In the step S275, the CPU 71 transmits the updated display parameter to the operation target printer according to SNMP. The CPU of the operation target printer sets the display color and display style of its screen by executing a printer-side screen setting process similar to the printer-side screen setting process in the second illustrative embodiment (see FIG. 16). Incidentally, in the step S800 of the printer-side screen setting process in the third illustrative embodiment, the operation target printer receives the display parameter from the server 7 according to SNMP.

The link display process in the third illustrative embodiment differs from the link display process in the first illustrative embodiment as follows. First, the link display process in the third illustrative embodiment is executed not by the CPU 311 of the printer 3 but by the CPU 71 of the server 7. In the step S500 in FIG. 10, the CPU 71 obtains a link HTML file stored in the HDD 74 of the server 7, or dynamically generates the link HTML file.

The screen setting process in the third illustrative embodiment differs from the screen setting process in the first illustrative embodiment as follows. In the step S345 in FIG. 8, the CPU 311 of the printer 3 transmits the updated display parameter to the server 7 according to SNMP.

The PC-side screen setting process in the third illustrative embodiment is a process similar to the PC-side screen setting process in the first illustrative embodiment (see FIG. 13). In the third illustrative embodiment, the PC 2 displays a Web page screen according to the screen file in the HTML format received from the server 7.

Figure 21:
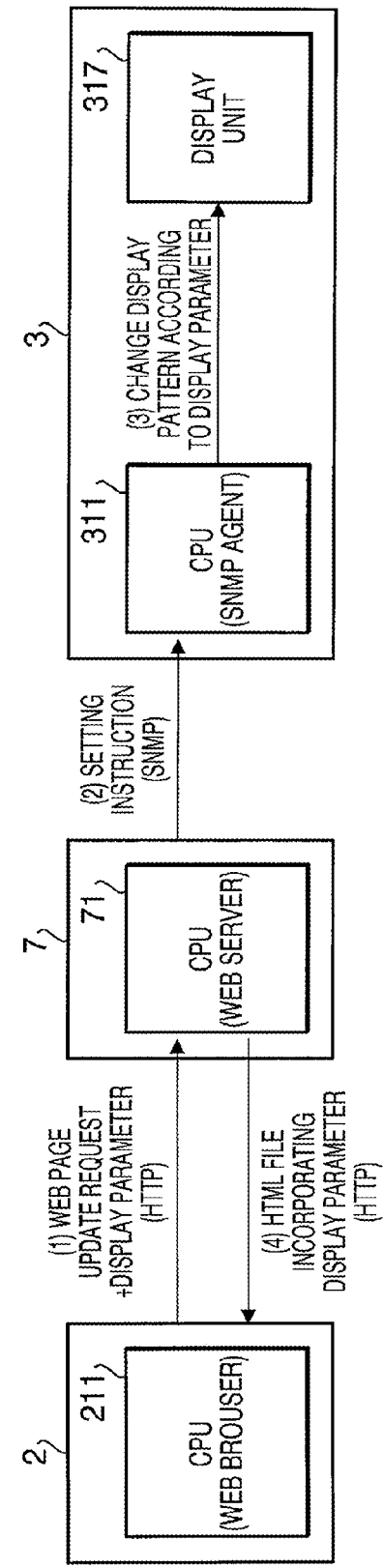
FIG. 21 is an explanatory drawing schematically showing the operation of a PC, a printer and the server in the printing system of the third embodiment.

To summarize the above explanation of the printing system 1B of the third illustrative embodiment referring to FIG. 21, for example, when the printer 3 is designated as the operation target of the PC 2, the CPU 211 of the PC 2 transmits the Web page update request and the display parameter specifying the selected display color and/or display style to the server 7 (1). The CPU 71 of the server 7 transmits a setting instruction (requesting the printer 3 to set the display pattern specified by the display parameter thereto) to the printer 3 (2). The CPU 311 of the printer 3 receiving the setting instruction lets the display unit 317 change the display pattern of the background of the screen 32 according to the setting instruction (3).

Meanwhile, the CPU 71 of the server 7 updates the display parameter for the printer 3 (already set to the server 7) according to the display parameter received from the PC 2, and transmits a screen file in the HTML format (in which the same display parameter has been incorporated) to the PC 2 (4). The CPU 211 of the PC 2 receiving the screen file in the HTML format from the server 7 updates the display pattern of the background of the status display frame 62 on the Web browser screen according to the received screen file. Incidentally, FIG. 21 is an explanatory drawing schematically showing the operation of the PC 2, the printer 3 and the server 7 in the printing system 1B of the third illustrative embodiment.

Figure 22:
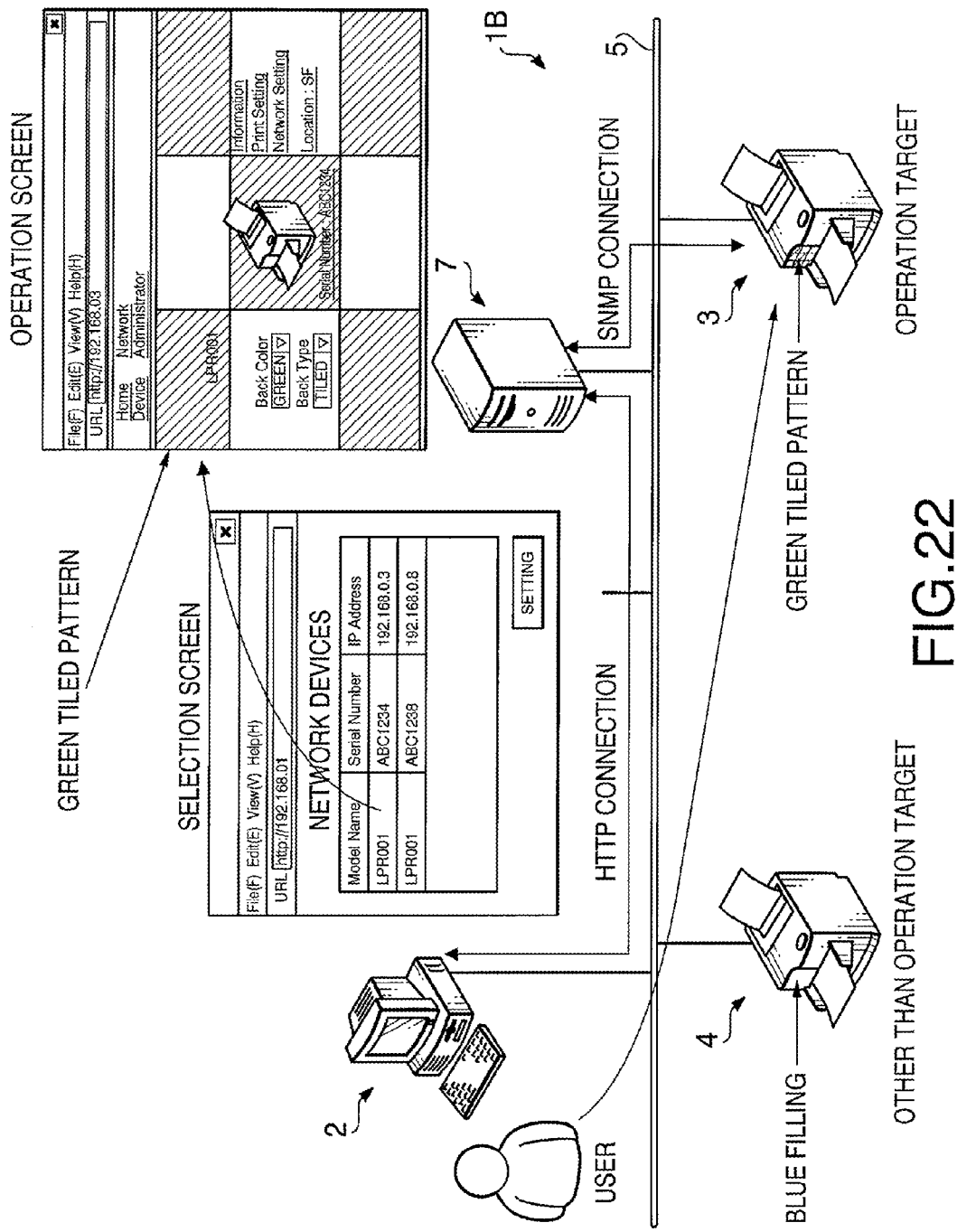
FIG. 22 is an explanatory drawing showing the effect of the printing system in accordance with the third embodiment.

Therefore, in the printing system 1B of the third illustrative embodiment, even when the printers 3 and 4 are of the same type (model), a display pattern identical with that of the background of the status display frame 62 on the Web browser screen displayed by the PC 2 is set to the background of the screen 32 of the printer 3 as shown in FIG. 22, by which the user of the PC 2 can recognize at a glance that the printer 3 is the printer designated as the operation target. Incidentally, FIG. 22 is an explanatory drawing showing the effect of the printing system 1B in accordance with the third illustrative embodiment.

As described above, the printing system 1B of the third illustrative embodiment achieves effects similar to those of the printing system 1 of the first illustrative embodiment.

While a description has been given above of illustrative embodiments in accordance with the present invention, the present invention is not to be restricted by the particular illustrative embodiments and a variety of modifications, design changes, etc. are possible without departing from the scope and spirit of the present invention described in the appended claims.

For example, while LCDs are employed as the screens 32 and 42 of the printers 3 and 4 in the above illustrative embodiments, display devices of other types capable color display, such as FEDs (Field Emission Displays), SEDs (Surface-conduction Electron-emitter Displays) and EL (ElectroLuminescence) displays, may of course be used as the screens 32 and 42 of the printers 3 and 4. It is also possible to employ light sources of different colors (e.g. LEDs) instead of the screen (32, 42) of each printer (3, 4) and turn on a light source of a color identical with that of the background of the operation screen or the status display frame 62 on the Web browser screen 6.

While the present invention is applied to printers in the above illustrative embodiments, the present invention can be applied to any devices connectable to a network, such as MFPs (Multi Function Peripherals) connectable to a network, scanners connectable to a network, AV (AudioVisual) devices connectable to a network, routers, etc.

The "Web browser program" collectively called in the above illustrative embodiments may either be a program implementing a Web browser only or a program implementing a Web browser functioning in cooperation with a CGI program, etc. By the cooperation with a CGI program, a Web browser that the user has got used to can be customized to suit the present invention without the need of replacing it with a different Web browser.

While whether both the display color and display style are identical with those of another printer is judged in the above illustrative embodiments, the judgment may also be made only for the display color or the display style. The judgment on the display style may be left out at the point when the display color is judged to be identical with that of another printer, or the judgment on the display color may be left out at the point when the display style is judged to be identical with that of another printer. It is also possible to judge whether the blinking mode is identical with that of another printer. By employing the blinking mode or the display style for the discrimination of the operation target printer from other printers, a system offering high usability also to users having difficulty in color identification can be realized.

The discrimination of the operation target printer from other printers employing the display color only is practically limited to ten—odd printers at most due to the limitation of human's color identification ability; however, the number of discriminable printers can be increased by employing a combination of display elements.

While the update of the display parameter in each printer (3, 4) in the screen setting process (FIG. 8) is also incorporated into the display of the PC 2 by letting the printer (3, 4) transmit an HTML file (screen file) incorporating the updated display parameter to the PC 2 (S345) in the first embodiment, the incorporation of update may also be implemented by letting the printer (3, 4) report the update of its status to the PC 2 according to HTTP so as to let the PC 2 recognize the status and incorporate the status into its display.

While the update of the display parameter in each printer (3, 4) in the screen setting process is also incorporated into the display of the PC 2 by letting the printer (3, 4) transmit (report) the updated display parameter to the PC 2 according to SNMP (S345) in the second illustrative embodiment, the incorporation of update may also be implemented by letting the printer (3, 4) report the update of its status to the PC 2 according to SNMP so as to let the PC 2 recognize the status and incorporate the status into its display.

While the update of the display parameter in each printer (3, 4) in the screen setting process is also incorporated into the display of the PC 2 by letting the server 7 transmit an HTML file (screen file) incorporating the updated display parameter to the PC 2 in the third illustrative embodiment, the incorporation of update may also be implemented by letting the printer (3, 4) or the server 7 report the update of the status of the printer (3, 4) to the PC 2 according to SNMP, HTTP, etc. so as to let the PC 2 recognize the status and incorporate the status into its display.

Figure 23:
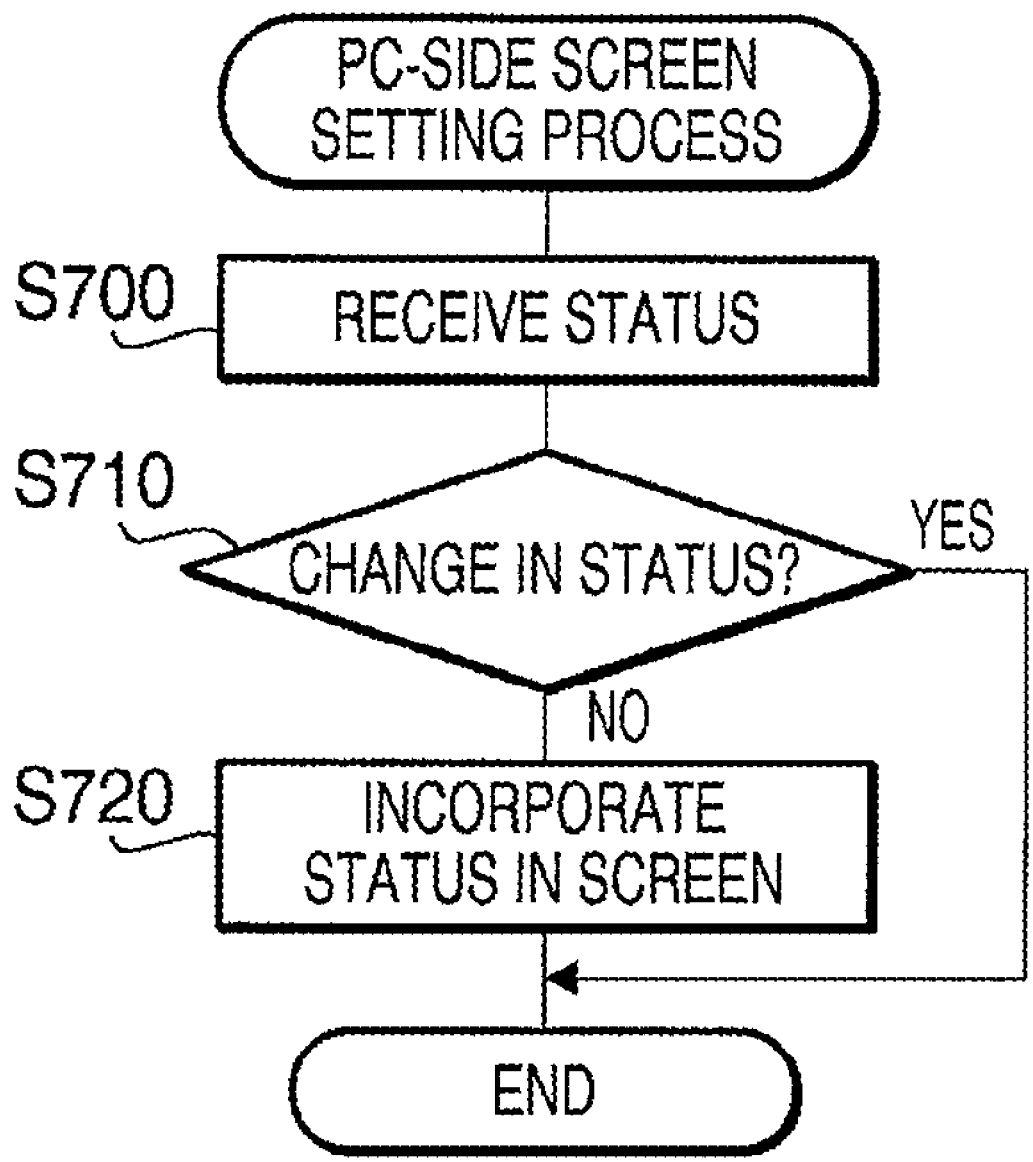
FIG. 23 is a flow chart showing the procedure of a PC-side screen setting process which is executed in a modification of the third embodiment.
Figure 24:
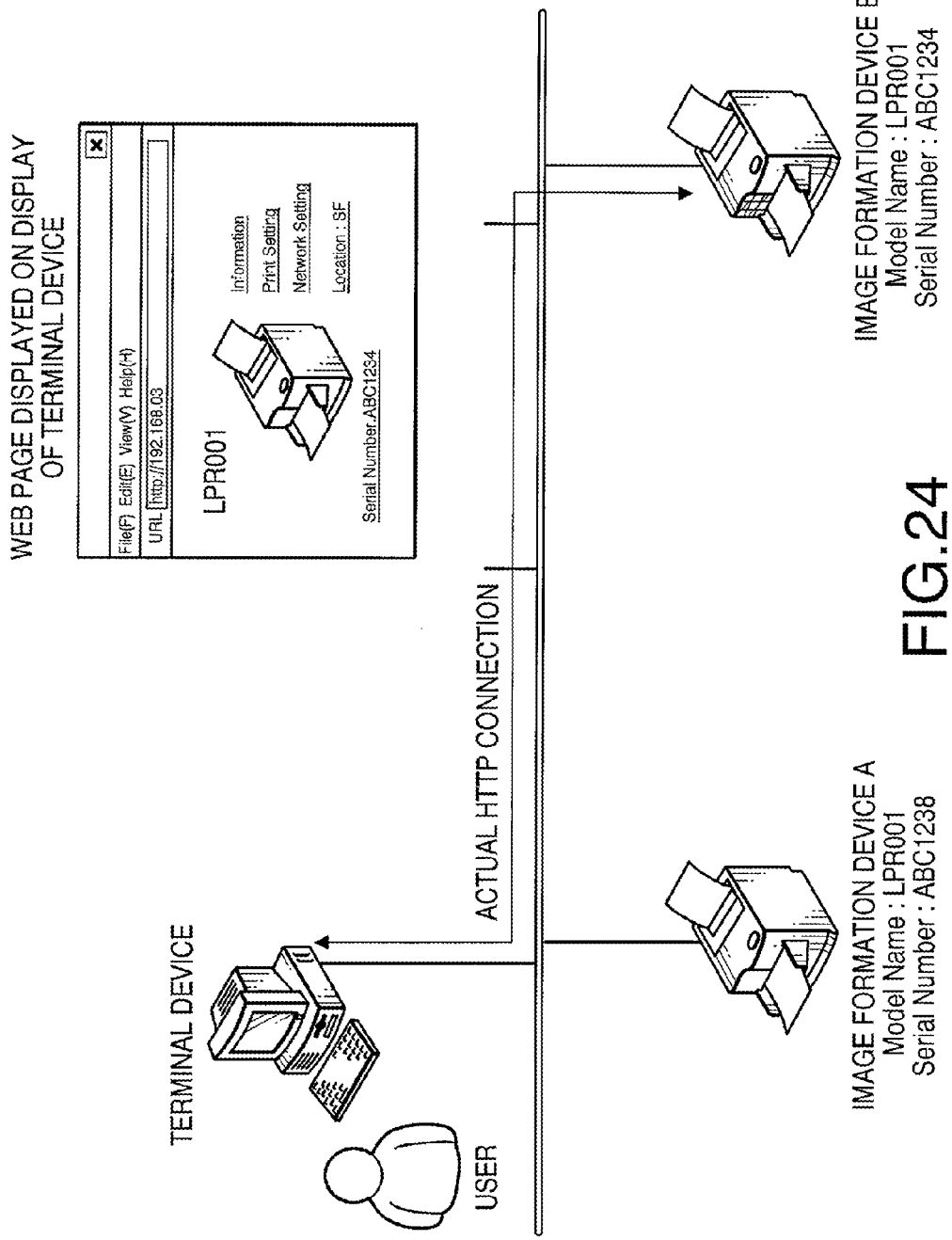
FIG. 24 is an explanatory drawing showing an example of a problem with a conventional system.

In this case, the CPU 211 of the PC 2 executes a PC-side screen setting process shown in FIG. 23. The CPU 211 executes the PC-side screen setting process when the status of a printer (3, 4) is received from the printer (3, 4) or the server 7.

As shown in FIG. 23, the CPU 211 of the PC 2 first receives the status (representing the external operation state, warning state, error state, etc.) of a printer (3, 4) from the printer (3, 4) or the server 7 (S700). Subsequently, the CPU 211 judges whether the received status is different from the previous status of the printer (S720). If the received status is identical with the previous status (S720: NO), the PC-side screen setting process of FIG. 23 is ended. If the received status is different from the previous status (S720: YES), the CPU 211 changes the display color and display style of the background of the operation screen of the application program or the Web page displayed on the display 22 into those corresponding to the received status (S720) and ends the PC-side screen setting process.

Instead of the above method letting each printer (3, 4) or the server 7 actively report the change (update) in the display parameter or the status to the PC 2 in the screen setting process, it is also possible to let the PC 2 periodically inquire of each printer (3, 4) or the server 7 about the change in the display parameter or the status in order to collect the information from the printers 3 and 4 or the server 7.

The method letting each printer (3, 4) or the server 7 actively report the change in the display parameter or the status to the PC 2 has an advantage in that a change in the display by a printer (3, 4) can immediately be incorporated into the display by the PC 2.

Meanwhile, the method letting the PC 2 periodically inquire of each printer (3, 4) or the server 7 about the change in the display parameter or the status has an advantage in that the communication loads on the PC 2, the printers 3 and 4, the network 5 and the server 7 do not increase from those for packet communication for the periodical printer status check widely employed in conventional systems.

What is claimed is:

1. An operation target identification system comprising:
   at least one terminal device connected to a network, the at least one terminal device having a first display;
   a plurality of devices connected to the network, each of the plurality of devices having a second display; and
   a server connected to the network at a point separate from the at least one terminal device;
   wherein the at least one terminal device has a first controller configured to:
      when a device is designated as an operation target and a display pattern is selected from a plurality of display patterns, send an update request over the network for updating an operation screen corresponding to the selected display pattern to the server; and
      when receiving display data from the server, update the operation screen according to the display data,
   wherein the server has a second controller configured to:
      receive, from each of the plurality of devices, information indicating a display pattern shown on its second display;
      generate data for enabling the at least one terminal device to display a list of the plurality of devices and transmit the generated data to the at least one terminal device;
      when receiving the update request, judge whether the selected display pattern of the designated device corresponds to one of the display patterns shown on the plurality of devices other than the designated device based on the information received from each of the plurality of devices;
      if it is judged that the selected display pattern of the designated device corresponds to one of the display patterns of the devices other than the designated device, send, to the at least one terminal, a screen indicating that the selected display pattern of the designated device corresponds to one of the display patterns of the devices other than the designated device, the screen further providing an option to reselect one of the display patterns;
      if it is judged that the selected display pattern of the designated device does not correspond to one of the display patterns of the devices other than the designated device, send designation data for updating the selected display pattern to the device designated as the operation target;
      generate the display data for displaying the operation screen in accordance with the update request; and
      send the generated display data for updating the operation screen to the selected display pattern to the at least one terminal device over the network,
   wherein the device corresponding to the operation target has a third controller configured to:

when receiving the designation data from the server, update the display pattern on the second display of the operation target to the selected display pattern.

2. The operation target identification system according to claim 1, wherein the display pattern includes at least one of a display color and a display style.

3. The operation target identification system according to claim 1, wherein the at least one terminal device includes a web browser for accessing HTML files.

4. The operation target identification system according to claim 1, wherein the display data received by the at least one terminal device comprises web page data for displaying a web page and the web page is displayed on the first display.

5. The operation target identification system according to claim 4, wherein the web page presents the plurality of devices as a list, and the first controller is further configured to accept a selection from the list and to designate the operation target based on the selection.

6. The operation target identification system according to claim 4, wherein the web page contains at least one first button for designating one of the plurality of devices and at least one second button for selecting a display style.

7. The operation target identification system according to claim 1, wherein the second controller of the server is further configured to:
send the designation data to the device designated as the operation target using a first protocol; and
send the generated display data to the at least one terminal device using a second protocol.

8. The operation target identification system according to claim 7, wherein the first protocol is the Simple Network Management Protocol and the second protocol is the Hypertext Transfer Protocol.

9. A terminal device connected to a network for operating a plurality of devices connected to the network, comprising:
a display; and
a controller configured to:
when a device is designated as an operation target and a display pattern is selected from a plurality of display patterns, send an update request over the network for updating an operation screen corresponding to the selected display pattern to a server; and
when receiving display data from the server, update the operation screen according to the display data,
wherein the server is connected to the network at a point separate from the terminal device, and
wherein the server has a second controller configured to:
receive, from each of the plurality of devices, information indicating a display pattern shown on its second display;
generate data for enabling the at least one terminal device to display a list of the plurality of devices and transmit the generated data to the at least one terminal device;
when receiving the update request, judge whether the selected display pattern of the designated device corresponds to one of the display patterns shown on the plurality of devices other than the designated device based on the information received from each of the plurality of devices;
if it is judged that the selected display pattern of the designated device corresponds to one of the display patterns of the devices other than the designated device, send, to the at least one terminal, a screen indicating that the selected display pattern of the designated device corresponds to one of the display patterns of the devices other than the designated device, the screen further providing an option to reselect one of the display patterns;
if it is judged that the selected display pattern of the designated device does not correspond to one of the display patterns of the devices other than the designated device, send designation data for updating the selected display pattern to the device designated as the operation target;
generate the display data for displaying the operation screen in accordance with the update request; and
send the generated display data for updating the operation screen to the selected display pattern to the terminal device over the network, and
wherein the device corresponding to the operation target has a third controller configured to:
when receiving the designation data from the server, update the display pattern on a second display of the operation target to the selected display pattern.

10. The terminal device according to claim 9, wherein the display pattern includes at least one of a display color and a display style.

11. The terminal device of claim 9, wherein the terminal device comprises a web browser, wherein the display data received by the terminal device comprises web page data for displaying a web page on the display,
wherein the web page includes first buttons for designating the operation target and second buttons for selecting a display style, and
wherein the web browser transmits, to the server, information specifying the selected display style.

12. A server connected to a network including a plurality of devices and a terminal device operating the devices, comprising:
a controller configured to:
receive, from each of the plurality of devices, information indicating a display pattern shown on its second display;
generate data for enabling the terminal device to display a list of the plurality of devices and transmit the generated data to the terminal device;
when receiving an update request, judge whether a selected display pattern of a designated device corresponds to one of the display patterns shown on the plurality of devices other than the designated device based on the information received from each of the plurality of devices;
if it is judged that the selected display pattern of the designated device corresponds to one of the display patterns of the devices other than the designated device, send, to the terminal, a screen indicating that the selected display pattern of the designated device corresponds to one of the display patterns of the devices other than the designated device, the screen further providing an option to reselect one of the display patterns;
if it is judged that the selected display pattern of the designated device does not correspond to one of the display patterns of the devices other than the designated device, send designation data for updating the selected display pattern to the designated device designated as an operation target;
generate display data for displaying an operation screen in accordance with the update request; and
send the generated display data for updating the operation screen to the selected display pattern to the terminal device over the network, wherein the terminal device is connected at a point on the network separate from the server and has a second controller configured to:
when a device is designated as an operation target and a display pattern is selected from display patterns, send an update request over the network for updating an operation screen corresponding to the selected display pattern to the server; and
when receiving display data from the server, update the operation screen according to the display data, and
wherein the device corresponding to the operation target has a third controller configured to:
when receiving the designation data from the server, update the display pattern on a second display of the operation target to the selected display pattern.

13. The server according to claim 12, wherein the display format includes at least one of a display color and a display style.

14. The server of claim 12, wherein the server receives, from the terminal device, information specifying a designated display style,
wherein the controller is further configured to transmit, to one of the plurality of devices, information for instructing the device to display a screen according to the designated display style.

15. A non-transitory computer readable storage medium having computer-readable instructions stored thereon that, when executed by a processor, cause a terminal device, connected to a network for operating a plurality of devices connected to the network, to:
when a device is designated as an operation target and a display pattern is selected from display patterns, send an update request for updating an operation screen corresponding to the selected display pattern to a server over the network; and
when receiving display data from the server, update the operation screen according to the display data,
wherein the server is connected to the network at a point separate from the terminal device, and
wherein the server has a second controller configured to:
receive, from each of the plurality of devices, information indicating a display pattern shown on its second display;
generate data for enabling the terminal device to display a list of the plurality of devices and transmit the generated data to the terminal device;
when receiving the update request, judge whether the selected display pattern of the designated device corresponds to one of the display patterns shown on the plurality of devices other than the designated device based on the information received from each of the plurality of devices;
if it is judged that the selected display pattern of the designated device corresponds to one of the display patterns of the devices other than the designated device, send, to the terminal, a screen indicating that the selected display pattern of the designated device corresponds to one of the display patterns of the devices other than the designated device, the screen further providing an option to reselect one of the display patterns;
if it is judged that the selected display pattern of the designated device does not correspond to one of the display patterns of the devices other than the designated device, send designation data for updating the selected display pattern to the device designated as the operation target;
generate the display data for displaying the operation screen in accordance with the update request; and
send the generated display data for updating the operation screen to the selected display pattern to the terminal device over the network, and
wherein the device corresponding to the operation target has a third controller configured to:
when receiving the designation data from the server, update the display pattern on a second display of the operation target to the selected display pattern.

16. The non-transitory computer readable storage medium according to claim 15, wherein the display format includes at least one of a display color and a display style.

17. The non-transitory computer readable storage medium of claim 15, the computer readable medium having additional instructions stored thereon that, when executed by the processor, cause the terminal device to run a web browser,
wherein the display data received by the terminal device comprises web page data for displaying a web page on the display,
wherein the web page includes first buttons for designating the operation target and second buttons for selecting a display style, and
wherein the web browser transmits, to the server, information specifying the selected display style.

18. A non-transitory computer readable storage medium having computer-readable instructions stored thereon that when executed by a processor cause a server, connected to a network including a plurality of devices and terminal device operating the devices, to:
receive, from each of the plurality of devices, information indicating a display pattern shown on its second display;
generate data for enabling the terminal device to display a list of the plurality of devices and transmit the generated data to the terminal device;
when receiving the update request, judge whether a selected display pattern of a designated device corresponds to one of the display patterns shown on the plurality of devices other than the designated device based on the information received from each of the plurality of devices;
if it is judged that the selected display pattern of the designated device corresponds to one of the display patterns of the devices other than the designated device, send, to the terminal, a screen indicating that the selected display pattern of the designated device corresponds to one of the display patterns of the devices other than the designated device, the screen further providing an option to reselect one of the display patterns;
if it is judged that the selected display pattern of the designated device does not correspond to one of the display patterns of the devices other than the designated device, send designation data for updating a selected display pattern to the designated device designated as an operation target;
generate display data for displaying an operation screen in accordance with the update request; and
send the generated display data for updating the operation screen to the selected display pattern to the terminal device over the network,
wherein the terminal device is connected at a point on the network separate from the server and has a second controller configured to:
when a device is designated as an operation target and a display pattern is selected from display patterns, send an update request over the network for updating an operation screen corresponding to the selected display pattern to the server; and when receiving display data from the server, update the operation screen according to the display data, and wherein the device corresponding to the operation target has a third controller configured to:

when receiving the designation data from the server, update the display pattern on a second display of the operation target to the selected display pattern.

19. The non-transitory computer readable storage medium according to claim 18, wherein the display pattern includes at least one of a display color and a display style.

20. The non-transitory computer readable storage medium of claim 18, the computer readable medium having additional instructions stored thereon that, when executed by the processor, cause the server to:

receive, from the terminal device, information specifying a designated display style; and transmit, to one of the plurality of devices, information for instructing the device to display a screen according to the designated display style.

* * * * *